(12) United States Patent
Ahn et al.

(10) Patent No.: US 12,463,942 B2
(45) Date of Patent: *Nov. 4, 2025

(54) RULE SWAPPING IN A PACKET NETWORK

(71) Applicant: Centripetal Networks, LLC, Portsmouth, NH (US)

(72) Inventors: David K. Ahn, Winston-Salem, NC (US); Steven Rogers, Leesburg, VA (US); Sean Moore, Hollis, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/086,974

(22) Filed: Dec. 22, 2022

(65) Prior Publication Data

US 2023/0208811 A1      Jun. 29, 2023

Related U.S. Application Data

(63) Continuation of application No. 17/859,156, filed on Jul. 7, 2022, now Pat. No. 11,539,665, which is a
(Continued)

(51) Int. Cl.
*H04L 9/40*        (2022.01)
*G06N 5/02*        (2023.01)
*H04L 41/16*       (2022.01)

(52) U.S. Cl.
CPC .......... *H04L 63/0263* (2013.01); *G06N 5/02* (2013.01); *H04L 41/16* (2013.01)

(58) Field of Classification Search
CPC ........ H04L 63/0263; H04L 41/16; G06N 5/02
See application file for complete search history.

(56) References Cited

U.S. PATENT DOCUMENTS 5,226,141 A  *  7/1993  Esbensen ............ G06F 12/0866
                                              711/111
6,098,172 A      8/2000  Coss et al.
(Continued)

FOREIGN PATENT DOCUMENTS

AU      2005328336 B2      9/2011
AU      2006230171 B2      6/2012
(Continued)

OTHER PUBLICATIONS

Aug. 9, 2018 (US) Non-Final Office Action—U.S. Appl. No. 15/413,947.
(Continued)

*Primary Examiner* — David Garcia Cervetti
(74) *Attorney, Agent, or Firm* — Banner & Witcoff, Ltd.

(57)    ABSTRACT

In some variations, first and second rule sets may be received by a network protection device. The first and second rule sets may be preprocessed. The network protection device may be configured to process packets in accordance with the first rule set. Packets may be received by the network protection device. A first portion of the packets may be processed in accordance with the first rule set. The network protection device may be reconfigured to process packets in accordance with the second rule set. A second portion of the packets may be processed in accordance with the second rule set.

30 Claims, 9 Drawing Sheets

Related U.S. Application Data continuation of application No. 16/892,424, filed on Jun. 4, 2020, now Pat. No. 11,502,996, which is a continuation of application No. 16/744,341, filed on Jan. 16, 2020, now Pat. No. 10,681,009, which is a continuation of application No. 16/357,855, filed on Mar. 19, 2019, now Pat. No. 10,541,972, which is a continuation of application No. 15/610,995, filed on Jun. 1, 2017, now Pat. No. 10,284,522, which is a continuation of application No. 14/921,718, filed on Oct. 23, 2015, now Pat. No. 9,674,148, which is a continuation of application No. 13/739,178, filed on Jan. 11, 2013, now Pat. No. 9,203,806.

(56) References Cited

U.S. PATENT DOCUMENTS

| | | | |
|---|---|---|---|
| 6,147,976 | A | 11/2000 | Shand et al. |
| 6,208,640 | B1 | 3/2001 | Spell et al. |
| 6,226,372 | B1 | 5/2001 | Beebe et al. |
| 6,279,113 | B1 | 8/2001 | Vaidya |
| 6,298,340 | B1 * | 10/2001 | Calvignac ............ G06F 16/9027 |
| | | | 707/999.102 |
| 6,317,837 | B1 | 11/2001 | Kenworthy |
| 6,484,261 | B1 | 11/2002 | Wiegel |
| 6,611,875 | B1 | 8/2003 | Chopra et al. |
| 6,662,235 | B1 | 12/2003 | Callis et al. |
| 6,678,827 | B1 | 1/2004 | Rothermel et al. |
| 6,691,168 | B1 | 2/2004 | Bal et al. |
| 6,826,694 | B1 | 11/2004 | Dutta et al. |
| 6,907,042 | B1 | 6/2005 | Oguchi |
| 6,971,028 | B1 | 11/2005 | Lyle et al. |
| 7,043,467 | B1 * | 5/2006 | Milito ................. H04L 69/329 |
| | | | 706/45 |
| 7,054,930 | B1 | 5/2006 | Cheriton |
| 7,089,581 | B1 | 8/2006 | Nagai et al. |
| 7,095,716 | B1 | 8/2006 | Ke et al. |
| 7,107,613 | B1 | 9/2006 | Chen et al. |
| 7,143,438 | B1 | 11/2006 | Coss et al. |
| 7,152,240 | B1 | 12/2006 | Green et al. |
| 7,185,368 | B2 | 2/2007 | Copeland, III |
| 7,215,637 | B1 | 5/2007 | Ferguson et al. |
| 7,225,269 | B2 | 5/2007 | Watanabe |
| 7,227,842 | B1 | 6/2007 | Ji et al. |
| 7,237,267 | B2 | 6/2007 | Rayes et al. |
| 7,263,099 | B1 | 8/2007 | Woo et al. |
| 7,296,288 | B1 | 11/2007 | Hill et al. |
| 7,299,353 | B2 | 11/2007 | Le Pennec et al. |
| 7,320,022 | B2 * | 1/2008 | Hayter ................. H04L 45/00 |
| | | | 709/215 |
| 7,331,061 | B1 | 2/2008 | Ramsey et al. |
| 7,478,429 | B2 | 1/2009 | Lyon |
| 7,499,412 | B2 | 3/2009 | Matityahu et al. |
| 7,539,186 | B2 | 5/2009 | Aerrabotu et al. |
| 7,610,621 | B2 | 10/2009 | Turley et al. |
| 7,684,400 | B2 | 3/2010 | Govindarajan et al. |
| 7,710,885 | B2 | 5/2010 | Ilnicki et al. |
| 7,721,084 | B2 | 5/2010 | Salminen et al. |
| 7,792,775 | B2 | 9/2010 | Matsuda |
| 7,814,158 | B2 | 10/2010 | Malik |
| 7,814,546 | B1 | 10/2010 | Strayer et al. |
| 7,818,794 | B2 | 10/2010 | Wittman |
| 7,849,502 | B1 | 12/2010 | Bloch et al. |
| 7,913,303 | B1 | 3/2011 | Rouland et al. |
| 7,954,143 | B2 | 5/2011 | Aaron |
| 8,004,994 | B1 | 8/2011 | Darisi et al. |
| 8,009,566 | B2 | 8/2011 | Zuk et al. |
| 8,037,517 | B2 | 10/2011 | Fulp et al. |
| 8,042,167 | B2 | 10/2011 | Fulp et al. |
| 8,117,655 | B2 | 2/2012 | Spielman |
| 8,156,206 | B2 | 4/2012 | Kiley et al. |
| 8,176,561 | B1 | 5/2012 | Hurst et al. |
| 8,219,675 | B2 | 7/2012 | Ivershen |
| 8,271,645 | B2 | 9/2012 | Rajan et al. |
| 8,306,994 | B2 | 11/2012 | Kenworthy |
| 8,307,029 | B2 | 11/2012 | Davis et al. |
| 8,331,234 | B1 | 12/2012 | Newton et al. |
| 8,422,391 | B2 | 4/2013 | Zhu |
| 8,495,725 | B2 | 7/2013 | Ahn |
| 8,510,821 | B1 | 8/2013 | Brandwine et al. |
| 8,726,379 | B1 | 5/2014 | Stiansen et al. |
| 8,789,135 | B1 | 7/2014 | Pani |
| 8,806,638 | B1 | 8/2014 | Mani |
| 8,832,832 | B1 | 9/2014 | Visbal |
| 8,856,926 | B2 | 10/2014 | Narayanaswamy et al. |
| 8,935,785 | B2 | 1/2015 | Pandrangi |
| 9,094,445 | B2 | 7/2015 | Moore et al. |
| 9,124,552 | B2 | 9/2015 | Moore |
| 9,137,205 | B2 | 9/2015 | Rogers et al. |
| 9,154,446 | B2 | 10/2015 | Gemelli et al. |
| 9,160,713 | B2 | 10/2015 | Moore |
| 9,172,627 | B2 | 10/2015 | Kjendal et al. |
| 9,203,806 | B2 * | 12/2015 | Ahn .................... H04L 41/16 |
| 9,419,942 | B1 | 8/2016 | Buruganahalli et al. |
| 9,531,672 | B1 | 12/2016 | Li et al. |
| 9,634,911 | B2 | 4/2017 | Meloche |
| 9,686,193 | B2 | 6/2017 | Moore |
| 2001/0039579 | A1 | 11/2001 | Trcka et al. |
| 2001/0039624 | A1 | 11/2001 | Kellum |
| 2002/0016858 | A1 | 2/2002 | Sawada et al. |
| 2002/0038339 | A1 | 3/2002 | Xu |
| 2002/0049899 | A1 | 4/2002 | Kenworthy |
| 2002/0083345 | A1 | 6/2002 | Halliday et al. |
| 2002/0112188 | A1 | 8/2002 | Syvanne |
| 2002/0152209 | A1 | 10/2002 | Merugu et al. |
| 2002/0164962 | A1 | 11/2002 | Mankins et al. |
| 2002/0165949 | A1 | 11/2002 | Na et al. |
| 2002/0174255 | A1 | 11/2002 | Hayter et al. |
| 2002/0186683 | A1 | 12/2002 | Buck et al. |
| 2002/0198981 | A1 | 12/2002 | Corl et al. |
| 2003/0005122 | A1 | 1/2003 | Freimuth et al. |
| 2003/0014665 | A1 | 1/2003 | Anderson et al. |
| 2003/0018591 | A1 | 1/2003 | Komisky |
| 2003/0035370 | A1 | 2/2003 | Brustoloni |
| 2003/0051026 | A1 | 3/2003 | Carter et al. |
| 2003/0051165 | A1 | 3/2003 | Krishnan et al. |
| 2003/0088787 | A1 | 5/2003 | Egevang |
| 2003/0097590 | A1 | 5/2003 | Syvanne |
| 2003/0105976 | A1 | 6/2003 | Copeland |
| 2003/0120622 | A1 | 6/2003 | Nurmela et al. |
| 2003/0123456 | A1 | 7/2003 | Denz et al. |
| 2003/0142681 | A1 | 7/2003 | Chen et al. |
| 2003/0145225 | A1 | 7/2003 | Bruton et al. |
| 2003/0154297 | A1 | 8/2003 | Suzuki et al. |
| 2003/0154399 | A1 | 8/2003 | Zuk et al. |
| 2003/0188192 | A1 | 10/2003 | Tang et al. |
| 2003/0212900 | A1 | 11/2003 | Liu et al. |
| 2003/0220940 | A1 | 11/2003 | Futoransky et al. |
| 2004/0010712 | A1 | 1/2004 | Hui et al. |
| 2004/0015719 | A1 | 1/2004 | Lee et al. |
| 2004/0015905 | A1 * | 1/2004 | Huima ................. G06F 8/656 |
| | | | 717/141 |
| 2004/0073655 | A1 | 4/2004 | Kan et al. |
| 2004/0088542 | A1 | 5/2004 | Daude et al. |
| 2004/0093513 | A1 | 5/2004 | Cantrell et al. |
| 2004/0098511 | A1 | 5/2004 | Lin et al. |
| 2004/0114518 | A1 | 6/2004 | MacFaden et al. |
| 2004/0123220 | A1 | 6/2004 | Johnson et al. |
| 2004/0131056 | A1 | 7/2004 | Dark |
| 2004/0148520 | A1 | 7/2004 | Talpade et al. |
| 2004/0151155 | A1 | 8/2004 | Jouppi |
| 2004/0172529 | A1 | 9/2004 | Culbert |
| 2004/0172557 | A1 | 9/2004 | Nakae et al. |
| 2004/0177139 | A1 | 9/2004 | Schuba et al. |
| 2004/0181690 | A1 | 9/2004 | Rothermel et al. |
| 2004/0193943 | A1 | 9/2004 | Angelino et al. |
| 2004/0199629 | A1 | 10/2004 | Bomer et al. |
| 2004/0205360 | A1 | 10/2004 | Norton et al. |
| 2004/0250124 | A1 | 12/2004 | Chesla et al. |
| 2005/0010765 | A1 | 1/2005 | Swander et al. |
| 2005/0024189 | A1 | 2/2005 | Weber |
| 2005/0071650 | A1 | 3/2005 | Jo et al. |
| 2005/0076227 | A1 | 4/2005 | Kang et al. |

(56) References Cited

U.S. PATENT DOCUMENTS

| | | |
|---|---|---|
| 2005/0108557 A1 | 5/2005 | Kayo et al. |
| 2005/0114704 A1 | 5/2005 | Swander |
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0183140 A1 | 8/2005 | Goddard |
| 2005/0229246 A1 | 10/2005 | Rajagopal et al. |
| 2005/0249214 A1 | 11/2005 | Peng |
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1* | 3/2006 | Roese .............. H04L 41/0894 717/176 |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0092921 A1 | 5/2006 | Narayanan et al. |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195575 A1 | 8/2006 | Delany et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0118894 A1 | 5/2007 | Bhatia |
| 2007/0147380 A1 | 6/2007 | Ormazabal et al. |
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0028160 A1 | 1/2009 | Eswaran et al. |
| 2009/0138938 A1 | 5/2009 | Harrison et al. |
| 2009/0144819 A1 | 6/2009 | Babbar et al. |
| 2009/0150972 A1 | 6/2009 | Moon et al. |
| 2009/0168657 A1 | 7/2009 | Puri et al. |
| 2009/0172800 A1 | 7/2009 | Wool |
| 2009/0185568 A1 | 7/2009 | Cho et al. |
| 2009/0222877 A1 | 9/2009 | Diehl et al. |
| 2009/0240698 A1 | 9/2009 | Shukla et al. |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0183015 A1 | 7/2010 | Inoue et al. |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0154470 A1 | 6/2011 | Grimes et al. |
| 2011/0185055 A1 | 7/2011 | Nappier et al. |
| 2011/0214157 A1 | 9/2011 | Korsunsky et al. |
| 2011/0258694 A1* | 10/2011 | Wu .................. H04L 43/028 726/13 |
| 2011/0270956 A1 | 11/2011 | McDysan et al. |
| 2011/0277034 A1 | 11/2011 | Hanson |
| 2012/0023576 A1 | 1/2012 | Sorensen et al. |
| 2012/0084866 A1 | 4/2012 | Stolfo |
| 2012/0106354 A1 | 5/2012 | Pleshek et al. |
| 2012/0110128 A1 | 5/2012 | Aaron et al. |
| 2012/0110656 A1 | 5/2012 | Santos et al. |
| 2012/0113987 A1 | 5/2012 | Riddoch et al. |
| 2012/0117354 A1* | 5/2012 | Tatsumura ........ H04L 12/6418 711/E12.002 |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0314617 A1 | 12/2012 | Erichsen et al. |
| 2012/0331543 A1 | 12/2012 | Bostrom et al. |
| 2013/0007257 A1 | 1/2013 | Ramaraj et al. |
| 2013/0031544 A1* | 1/2013 | Sridharan ........... G06F 11/1484 718/1 |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0081102 A1* | 3/2013 | Beauvais ............. G06F 21/552 726/1 |
| 2013/0104236 A1 | 4/2013 | Ray et al. |
| 2013/0117852 A1 | 5/2013 | Stute |
| 2013/0125230 A1 | 5/2013 | Koponen et al. |
| 2013/0139236 A1 | 5/2013 | Rubinstein et al. |
| 2013/0254766 A1 | 9/2013 | Zuo et al. |
| 2013/0291100 A1 | 10/2013 | Ganapathy et al. |
| 2013/0304742 A1* | 11/2013 | Roman ............... H04L 51/212 707/740 |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0150051 A1 | 5/2014 | Bharali et al. |
| 2014/0156702 A1 | 6/2014 | Shyamsunder et al. |
| 2014/0165130 A1 | 6/2014 | Zaitsev |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0245423 A1 | 8/2014 | Lee |
| 2014/0259170 A1 | 9/2014 | Amsler |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0317737 A1 | 10/2014 | Shin et al. |
| 2014/0337613 A1 | 11/2014 | Martini |
| 2014/0365372 A1 | 12/2014 | Ross et al. |
| 2014/0366132 A1 | 12/2014 | Stiansen et al. |
| 2015/0033336 A1 | 1/2015 | Wang et al. |
| 2015/0052601 A1 | 2/2015 | White et al. |
| 2015/0106930 A1 | 4/2015 | Honda et al. |
| 2015/0128274 A1 | 5/2015 | Giokas |
| 2015/0135325 A1 | 5/2015 | Stevens et al. |
| 2015/0207809 A1 | 7/2015 | Macaulay |
| 2015/0237012 A1 | 8/2015 | Moore |

(56) References Cited

U.S. PATENT DOCUMENTS

| | | | |
|---|---|---|---|
| 2015/0244734 | A1 | 8/2015 | Olson et al. |
| 2015/0256431 | A1 | 9/2015 | Buchanan et al. |
| 2015/0304354 | A1 | 10/2015 | Rogers et al. |
| 2015/0334125 | A1 | 11/2015 | Bartos et al. |
| 2015/0341389 | A1 | 11/2015 | Kurakami |
| 2015/0347246 | A1 | 12/2015 | Matsui et al. |
| 2015/0350110 | A1 | 12/2015 | McGeer |
| 2015/0350229 | A1 | 12/2015 | Mitchell |
| 2015/0372977 | A1 | 12/2015 | Yin |
| 2015/0373043 | A1 | 12/2015 | Wang et al. |
| 2016/0020968 | A1 | 1/2016 | Aumann et al. |
| 2016/0028751 | A1 | 1/2016 | Cruz Mota et al. |
| 2016/0065611 | A1 | 3/2016 | Fakeri-Tabrizi et al. |
| 2016/0112443 | A1 | 4/2016 | Grossman et al. |
| 2016/0119365 | A1 | 4/2016 | Barel |
| 2016/0127417 | A1 | 5/2016 | Janssen |
| 2016/0191558 | A1 | 6/2016 | Davison |
| 2016/0205069 | A1 | 7/2016 | Blocher et al. |
| 2016/0219065 | A1 | 7/2016 | Dasgupta et al. |
| 2016/0285706 | A1 | 9/2016 | Rao |
| 2016/0294870 | A1 | 10/2016 | Banerjee et al. |
| 2016/0366099 | A1 | 12/2016 | Jordan |
| 2017/0223046 | A1 | 8/2017 | Singh |
| 2017/0272469 | A1 | 9/2017 | Kraemer et al. |
| 2018/0343238 | A1* | 11/2018 | Tola .................. H04L 63/0421 |

FOREIGN PATENT DOCUMENTS

| | | | |
|---|---|---|---|
| CA | 2600236 | A1 | 10/2006 |
| EP | 1006701 | A2 | 6/2000 |
| EP | 1313290 | A1 | 5/2003 |
| EP | 1484884 | A2 | 12/2004 |
| EP | 1677484 | A2 | 7/2006 |
| EP | 2385676 | A1 | 11/2011 |
| EP | 2498442 | A1 | 9/2012 |
| EP | 1864226 | B1 | 5/2013 |
| KR | 20010079361 | A | 8/2001 |
| WO | 2005046145 | A1 | 5/2005 |
| WO | 2006093557 | A2 | 9/2006 |
| WO | 2006105093 | A2 | 10/2006 |
| WO | 2007109541 | A2 | 9/2007 |
| WO | 2011038420 | A2 | 3/2011 |
| WO | 2012146265 | A1 | 11/2012 |

OTHER PUBLICATIONS

Dec. 18, 2018 (US) Final Office Action—U.S. Appl. No. 15/610,995.
Jul. 11, 2018 (US) Declaration of Kevin Jeffay, PhD in Support of Petition for Inter Partes Review of U.S. Pat. No. 9,565,213—IPR2018-01386.
Jul. 12, 2018 (US) Petition for Inter Partes Review of U.S. Pat. No. 9,565,213—IPR2018-01386.
Jul. 13, 2018 (US) Notice of Allowance—U.S. Appl. No. 15/414,117.
Jul. 20, 2018 (US) Declaration of Dr. Stuart Staniford in Support of Petition for Inter Partes Review of U.S. Pat. No. 9,124,552—IPR2018-01436.
Jul. 20, 2018 (US) Declaration of Dr. Stuart Staniford in Support of Petition for Inter Partes Review of U.S. Pat. No. 9,160,713—IPR2018-01437.
Jul. 20, 2018 (US) Petition for Inter Partes Review of U.S. Pat. No. 9,124,552—IPR2018-01436.
Jul. 20, 2018 (US) Petition for Inter Partes Review of U.S. Pat. No. 9,160,713—IPR2018-01437.
Jul. 26, 2018 (US) Declaration of Kevin Jeffay, PhD in Support of First Petition for Inter Partes Review of U.S. Pat. No. 9,137,205—IPR2018-01443.
Jul. 26, 2018 (US) Declaration of Kevin Jeffay, PhD in Support of Second Petition for Inter Partes Review of U.S. Pat. No. 9,137,205—IPR2018-01444.
Jul. 27, 2018 (US) First Petition for Inter Partes Review of U.S. Pat. No. 9,137,205—IPR2018-01443.
Jul. 27, 2018 (US) Non-Final Office Action—U.S. Appl. No. 15/382,806.
Jul. 27, 2018 (US) Second Petition for Inter Partes Review of U.S. Pat. No. 9,137,205—IPR2018-01444.
Jul. 5, 2018 (US) Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 (US) Non-Final Office Action—U.S. Appl. No. 14/745,207.
May 25, 2018 (US) Notice of Allowance—U.S. Appl. No. 15/413,834.
Nov. 14, 2018 (US) Final Office Action—U.S. Appl. No. 14/745,207.
Oct. 12, 2018 (US) Non-Final Office Action—U.S. Appl. No. 16/039,896.
Oct. 4, 2018 (US) Non-Final Office Action—U.S. Appl. No. 16/030,374.
Oct. 4, 2018 (US) Notice of Allowance—U.S. Appl. No. 15/827,477.
Sep. 17, 2018 (US) Declaration of Narasimha Reddy Ph.D., in Support of Petition for Inter Partes Review of U.S. Pat. No. 9,560,176 (First)—IRP2018-01654.
Sep. 17, 2018 (US) Declaration of Narasimha Reddy Ph.D., in Support of Petition for Inter Partes Review of U.S. Pat. No. 9,560,176 (Second)—IRP2018-01655.
Sep. 17, 2018 (US) Petition for Inter Partes Review of U.S. Pat. No. 9,560,176 (First)—IPR 2018-01654.
Sep. 17, 2018 (US) Petition for Inter Partes review of U.S. Pat. No. 9,560,176 (Second)—IPR2018-01655.
Sep. 27, 2018 (WO) International Search Report and Written Opinion—App. PCT/US2018/043367.
Sep. 4, 2018 (WO) International Search Report and Written Opinion—App. PCT/US2018/041355.
Sep. 27, 2018 (US) Non-Final Office Action—U.S. Appl. No. 15/614,956.
Apr. 2, 2019 (US) Decision—Institution of Inter Partes Review of U.S. Pat. No. 9,560,077—IPR 2018-01513.
Apr. 8, 2019 (US) Final Office Action—U.S. Appl. No. 15/413,947.
Feb. 21, 2019 (US) Final Office Action—U.S. Appl. No. 15/382,806.
Feb. 6, 2019 (US) Final Office Action—U.S. Appl. No. 15/413,750.
Feb. 6, 2019 (US) Notice of Allowance and Fees Due—U.S. Appl. No. 16/039,896.
Jan. 24, 2019 (US) Decision—Institution of Inter Partes Review of U.S. Pat. No. 9,124,552 B2—IPR 2018-01436.
Jan. 24, 2019 (US) Notice of Allowance—U.S. Appl. No. 15/610,995.
Jun. 3, 2019 (EP) Communication pursuant to Article 94(3) EPC—Third Examination Report—App. 13765547.8.
Jun. 3, 2019 (US) Final Office Action—U.S. Appl. No. 15/614,956.
Mar. 11, 2019 (US) Final Office Action—U.S. Appl. No. 16/030,354.
Mar. 18, 2019 (AU) First Examination Report—App. 2016379156.
Jan. 24, 2019 (US) Decision—Institution of Inter Partes Review of U.S. Pat. No. 9,160,713 B2—IPR 2018-01437.
Mar. 8, 2019 (US) Notice of Allowance and Fees Due—U.S. Appl. No. 16/030,374.
Mar. 8, 2019 (US) Notice of Allowance and Fees Due—U.S. Appl. No. 16/060,374.
May 23, 2019 (US) Non-Final Office Action—U.S. Appl. No. 14/745,207.
May 24, 2019 (US) Non-Final Office Action—U.S. Appl. No. 16/111,524.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE INFOCOM, 1203-1212, 2000.
Acharya et al, "OPTWALL: A Hierarchical Traffic-Aware Firewall," Department of Computer Science, Telecommunications Program, University of Pittsburgh, pp. 1-11 (2007).
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Bellion, "High Performance Packet Classification", http://www.hipac.org (Publication Date Unknown).

(56) References Cited

OTHER PUBLICATIONS

Blake, et al., "An Architecture for Differentiated Services," Network Working Group RFC 2475, Dec. 1998, 36 pages.
Blake, et al., "An Architecture for Differentiated Services," also known as the Diffserv architecture, as defined in RFC 2475, Network Working Group, Decemer 1998, 36 pages.
C. Benecke, "A Parallel Packet Screen for High Speed Networks", Proceedings of the 15th Annual Computer Security Applications Conference, 1999.
Chen, et al, "Research on the Anomaly Discovering Algorithm of the Packet Filtering Rule Sets," Sep. 2010, First International Confererence on Pervasive Computing, Signal Processing and Applications, pp. 362-366.
D. Comer, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Frahim, et al., "Cisco ASA: All-in-One Firewall, IPS, and VPN Adaptive Security Appliance," Indiana: Cisco Press: 2006, 54 pages.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P-Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with SURF"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35, 1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).

M. Al-Suwaiyel et al., "Algorithms for Trie Compaction", ACM Transactions on Database Systems, 9(2): 243-263, Jun. 1984.
M. Christiansen et al., "Using IDDs for Packet Filtering," Technical Report, BRICS, Oct. 2002.
M. Degermark et al., "Small Forwarding Tables for Fast Routing Lookups", Proceedings of ACM SIGCOMM, 4-13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al., "Definition of the Differentiated Services Field (DS Field) in the IPv4 and IPv6 Headers," Network Working Group RFC 2474, Dec. 1998, 20 pages.
O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE INFOCOM, 1434-1443, 2001.
Palo Alto Networks; "Designing A Zero Trust Network With Next-Generation Firewalls"; pp. 1-10; last viewed on Oct. 21, 2012.
Perkins, "IP Encapsulation with IP," Network Working Group RFC 2003, Oct. 1996, 14 pages.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5: 287-326, 1979.
Reddy, A.L.(2012) A.L. Narasimha Reddy Curriculum Vitae. Retrieved from https://cesg.tamu.edu/wp-content/uploads/2012/02/res_ext032. pdf, 16 pages.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Sourcefire 3D System User Guide, Version 4.10, Mar. 16, 2011, 2123 pages.
Statement RE: Related Application, dated Jul. 24, 2015.
Tarsa et al., "Balancing Trie-Based Policy representations for Network Firewalls," Department of Computer Science, Wake Forest University, pp. 1-6 (2006).
J. Ellermann et al., "Firewalls for ATM Networks", Proceedings of INFOSEC'COM, 1998.
May 9, 2023, *Cisco Systems GmbH v. Centripetal Networks, Inc.*, Submission before Hearing.
May 9, 2023, *Cisco Systems GmbH v. Centripetal Networks, Inc.*, Machine translation of Submission before Hearing as filed.
Jul. 10, 2023, *Keysight Technologies, Inc. v. Centripetal Networks, LLC*, IPR 2022-01607, Patent Owner's Response.
Jul. 10, 2023, *Keysight Technologies, Inc. v. Centripetal Networks, LLC*, IPR 2022-01607, Ex. 2005, Declaration of Dr. Michael T. Goodrich.
Jun. 26, 2023, *Keysight Technologies, Inc. v. Centripetal Networks, LLC*, Ex. 2006, Transcription of Deposition of Douglas W. Jacobson, Ph.D.
Jul. 10, 2023, Excerpts from Microsoft Computer Dictionary, Ex. 2008.

(56) References Cited

OTHER PUBLICATIONS

Apr. 19, 2001, Y. Tung and H. Che, "A Flow Caching Mechanism for Fast Packet Forwarding." Ex. 2010.
Jul. 10, 2023, T.V. Lakshman and D. Stiliadis, et al., High-Speed Policy-based Forwarding Using Efficient Multi-dimensional Range Matching., Ex. 2011.
Jul. 10, 2023, P. Gupta and N. McKeown, "Packet Classification and Multiple Fields." Ex. 2012.
July 8, 2023, Wikipedia Webpage—Maximum Transmission Unit, Ex. 2013.
Sep. 1, 2016, J.P. Casmira and D.R. Kaeli, "Modelling Cache Pollution." Ex. 2007.
Nov. 3, 2023, *Keysight Technologies, Inc.* v. *Centripetal Networks, LLC*, IPR 2022-01607, Petitioner's Reply to Patent Owner's Response.
Nov. 3, 2023, Cisco's Reasoning of Appeal in the German Nullity Proceedings of EP065 Patent.
Nov. 3, 2023, Cisco's Reasoning of Appeal in the German Nullity Proceedings of EP065 Patent—English Translation.
Apr. 16, 2024, *Keysight Technologies, Inc.* v. *Centripetal Networks, LLC*, IPR 2022-01607, U.S. Pat. No. 10,511,572B2, Final Written Decision.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al, "The Secure Shell (SSH) Transport Layer Protocol," SSH Communication Security Corp, Newtork Working Group RFC 4253, Jan. 2006, 32 pages.
Aug. 2, 2018 (US) Notice of Allowance and Fees Due—U.S. Appl. No. 16/030,254.
Jul. 5, 2019 (EP) Extended European Search Report—App. 19179539.2.
Aug. 2, 2019 (CA) Office Action—App. 2,888,935.
Aug. 2, 2019 (US) Non-Final Office Action—U.S. Appl. No. 16/448,969.
Aug. 16, 2019 (EP) Extended Search Report—App. 19170936.9.
Sep. 18, 2018 (US) Petition for Inter Partes Review of U.S. Pat. No. 9,413,722—IPR 2018-01760.
Sep. 18, 2018 (US) Declaration of Dr. Stuart Staniford in Support of Petition for Inter Partes Review of U.S. Pat. No. 9,413,722—IPR 2018-01760.
Sep. 3, 2019 (US) Notice of Allowance and Fees Due—U.S. Appl. No. 16/518,190.
Aug. 19, 2019 (EP) Communication pursuant to Article 94(3) EPC—Examination Report—App. 14719415.3.
Oct. 11, 2019—(US) Non-Final Office Action—U.S. Appl. No. 16/554,293.
Oct. 10, 2019—(US) Notice of Allowance—U.S. Appl. No. 16/448,997.
Sep. 30, 2019 (WO) International Search Report and Written Opinion of International Searching Authority—Application No. PCT/US2019/040830.
Exhibit 1022—"Transmission Control Protocol," IETF RFC 793. J. Postel, ed., Sep. 1981.
Exhibit 1023—"Internet Protocol," IETF RFC 791, J. Postel, ed., Sep. 1981.
Exhibit 1024—"File Transfer Protocol," IETF RFC 765, J. Postel, ed., Jun. 1980.
May 20, 2019 (US) Decision—Institution of Inter Partes Review of U.S. Pat. No. 9,413,722 B1—IPR 2018-01760.
Aug. 20, 2019 (US) Declaration of Dr. Alessandro Orso in Support of Patent Owner's Response of U.S. Pat. No. 9,413,722—IPR 2018-01760.
Feb. 21, 2019 (US) Patent Owner's Preliminary Response of U.S. Pat. No. 9,413,722—IPR 2018-01760.
Aug. 20, 2019 (US) Patent Owner's Response of U.S. Pat. No. 9,413,722—IPR 2018-01760.
Jan. 15, 2020 (US) Patent Owner's Sur-Reply to Petitioner's Reply—IPR 2018-01760.
Jan. 8, 2020 (US) Deposition of Jacob H. Baugher, III—IPR 2018-01760.
Mar. 5, 2020 (US) Final Written Decision Determining All Challenged Claims Unpatentable of U.S. Pat. No. 9,674,148 B2—IPR2018-01454.
Part 1 Attachment in German Nullity Action in EP2944065 date unknown.
Part 2 Attachment in German Nullity Action in EP2944065 dated Nov. 18, 2020.
Part 3 Attachment in German Nullity Action in EP2944065 date unknown.
Part 4 Attachment in German Nullity Action in EP2944065 date unknown.
Part 5 Attachment in German Nullity Action in EP2944065 date unknown.
Part 6 Attachment in German Nullity Action in EP2944065 date unknown.
Part 7 Attachment in German Nullity Action in EP2944065 dated Apr. 30, 2020.
Part 9 Attachment in German Nullity Action in EP2944065 date unknown.
Part 8 Attachment in German Nullity Action in EP2944065 date unknown.
2006, Analysis of Firewall Policy Rules Using Data Mining Techniques, Korosh Golnabi, Richard K. Min, Latifur Khan, Department of Computer Science.
Mar. 8, 2019, Decision Institution of Inter Partes Review, U.S. Pat. No. 9,674,148, *Cisco Systems, Inc.* v. *Centripetal Networks, Inc.*
Aug. 10, 2018, Petition for Inter Partes Review, IPR2018-01454, U.S. Pat. No. 9674148, *Cisco Systems, Inc.* v. *Centripetal Networks, Inc.*
Aug. 12, 2022, Petition for Inter Partes Review, IPR2022-01421, U.S. Pat. No. 10,681,009, *Keysight Technologies Inc.* v. *Centripetal Networks, Inc.*
Sep. 9, 2019, Petitioner's Reply, IPR2018-01454, Patent 96741148, *Cisco Systems, Inc.* v. *Centripetal Networks, Inc.*
Oct. 7, 2019, Patent Owner's Sur-Reply to Petitioner's Reply, IPR2018-01454, U.S. Pat. No. 9,674,148, *Cisco Systems, Inc.* v. *Centripetal Networks, Inc.*
Dec. 11, 2018, Patent Owner's Preliminary Response, IPR2018-01454, U.S. Pat. No. 9,674,148, *Cisco Systems, Inc.* v. *Centripetal Networks, Inc.*
Jun. 7, 2019, Patent Owner's Response, IPR2018-01454, U.S. Pat. No. 9,674,148, *Cisco Systems, Inc.* v. *Centripetal Networks, Inc.*
Sep. 30, 2022, *Keysight Technologies, Inc.* v. *Centripetal Networks, Inc.*, Petition for Inter Partes Review of U.S. Pat. No. 10,511,572.
Jun. 29, 2022, Paxson et al., An Architecture for Exploiting Multi-Core Processors to Parallelize Network Intrusion Prevention.
1993, Mano, "Computer System Architecture, Third Edition".
Sep. 30, 2022, *Keysight Technologies, Inc.* v. *Centripetal Networks, Inc.*, U.S. Pat. No. 10,511,572, IPR 2022-01607, Petition for Inter Partes Review.
Nov. 6, 2023, *Keysight Technologies, Inc.* v. *Centripetal Networks, Inc.*, IPR2022-01421, U.S. Pat. No. 10,681,009 B2, Decision Granting Institution of Inter Partes Review After Remand.
2023, Aug. 24, Keysight Technologies, Inc. v. Centripetal Networks, Inc., IPR2022-01421, Patent 10,681,009 B2, Decision, Vacating the Decision Denying Institution, and Remanding to the Patent Trial and Appeal Board for Further Proceedings.
Mar. 22, 2023, Decision Denying Institution of Inter Partes Review (*Keysigt Technologies* v. *Centripetal Networks*) IPR2022-01421, U.S. Pat. No. 10,681,009 B2.
May 2005, A 10 GB/s Firewall System for network Security in Photonic Era by Masaru Katayama.
Nov. 18, 2020, Nullity Suit of EP 2 944 065.
2010, "Computer Programming" ISBN 978-81-317-3055-3.

(56) References Cited

OTHER PUBLICATIONS

Jun. 2005, DAPNDNA-2 Dynamically Reconfigurable Processor, Fujitsu.
May 6, 2021, Response to Nullity Action for EP 2 944 065.
Feb. 6, 2023, Qualified Opinion for EP 2 944 065.
English Translation of Qualified Opinion, 2023.
May 17, 2023, *Cisco Systems GmbH v. Centripetal Networks, Inc.*, EP 2944065 (DE 602013051102), Decision of the German Federal Patent Court.
May 17, 2023, *Cisco Systems GmbH v. Centripetal Networks, Inc.*, EP 2944065, (DE 602013051102), Decision of the German Federal Patent Court, English Translation.
"Cisco ACNS Softward Configuration Guide for Centrally Managed Deployments," Release 5.5. Text Part No. OL-9136-01, Cisco Systems, Inc., 2006, 944 pages.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—(US) Office Action—U.S. Appl. No. 11/390,976.
Sep. 14, 2009 (US) Office Action—U.S. Appl. No. 11/316,331.
Apr. 29, 2010—(US) Interview Summary—U.S. Appl. No. 11/390,976.
Aug. 20, 2010—(AU) Office Action—App 2005328336.
Jun. 23, 2010—(US) Final Rejection—U.S. Appl. No. 11/316,331.
Mar. 26, 2010—(US) Final Rejection—U.S. Appl. No. 11/390,976.
Sep. 10, 2010—(AU) Office Action—App 2006230171.
Sep. 30, 2010—(US) Office Action—U.S. Appl. No. 11/390,976.
Apr. 27, 2011—(WO) International Search Report and Written Opinion—App PCT/US2010/054520.
Aug. 25, 2011—(US) Non Final Rejection—U.S. Appl. No. 12/871,806.
Feb. 14, 2011—(EP) Search Report—App 06758213.0.
Jun. 9, 2011—(US) Notice of Allowance—U.S. Appl. No. 11/390,976.
Mar. 3, 2011—(EP) Communication Pursuant to Rules 70(2) and 70a(2)—App 06758213.0.
Mar. 4, 2011—(US) Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—(US) Non Final Rejection—U.S. Appl. No. 12/871,806.
Feb. 6, 2012—(US) Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—(US) Final Rejection—U.S. Appl. No. 12/871,806.
Apr. 4, 2013—(US) Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—(US) Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—(US) Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—(US) Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015 (US) Notice of Allowance—U.S. Appl. No. 14/702,755.
Sep. 30, 2022, IPR 2022-1607—U.S. Pat. No. 10,511,572, *Keysight Technologies* v. *Centripetal Networks*—Declaration of Doug W. Jacobson, PHD.
Aug. 10, 2022, IPR2022-01421, U.S. Pat. No. 10,681,009, *Keysight Technologies* v. *Centripetal Networks*—Declaration of Doug W. Jacobson.
Jan. 20, 2023, IPR2022-01607, U.S. Pat. No. 10,511,572, *Keysight Technologies* v. *Centripetal Networks*, Patent Owner's Preliminary Response.
Dec. 29, 2022, IPR2022-1421, U.S. Pat. No. 10,681,009, *Keysight Technologies* v. *Centripetal Networks*, Patent Owner's Preliminary Response.
Apr. 15, 2016—(US) Notice of Allowance—U.S. Appl. No. 14/855,374.
Apr. 26, 2016—(US) Office Action—U.S. Appl. No. 14/745,207.
Dec. 5, 2016—(US) Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—(US) Non Final Office Action—U.S. Appl. No. 14/253,992.
Jan. 11, 2016—(US) Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—(US) Office Action—U.S. Appl. No. 14/921,718.
Jun. 9, 2016—(WO) International Search Report—PCT/US2016/026339.
Jun. 14, 2016—(US) Office Action—U.S. Appl. No. 14/625,486.
Jun. 16, 2016—(CA) Office Action—App 2,888,935.
May 6, 2016—(US) Office Action—U.S. Appl. No. 14/714,207.
May 13, 2016—(US) Office Action—U.S. Appl. No. 13/940,240.
Nov. 21, 2016—(US) Office Action—U.S. Appl. No. 14/745,207.
Oct. 5, 2016—(US) Notice of Allowance—U.S. Appl. No. 14/698,560.
Oct. 26, 2016—(US) Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—(US) Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—(US) Notice of Allowance—U.S. Appl. No. 14/625,486.
Feb. 15, 2017—(US) Notice of Allowance—U.S. Appl. No. 14/921,718.
Jul. 20, 2017 (US) Complaint for Patent Infringement—Case No. 2:17-cv-00383-HCN-LRL, Document 1, 38 pages.
Jun. 7, 2017—(US) Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 (US) Notice of Allowance—U.S. Appl. No. 14/690,302.
Nov. 3, 2017 (US) Non-Final Office Action—U.S. Appl. No. 15/413,834.

(56) References Cited

OTHER PUBLICATIONS

Oct. 1, 2017 (WO) International Preliminary Report on Patentability—App. PCT/US2016/026339.

Sep. 5, 2017 (US) Defendant Ixia's Partial Answer to Complaint for Patent Infringement—Case No. 2:17-cv-00383-HCN-LRL, Document 29, 14 pages.

Sep. 5, 2017 (US) Memorandum in Support of Defendant's Ixia and Keysight Technologies, Inc's Motion to Dismiss for Unpatentability Under 35 U.S.C. § 101—Case No. 2:17-cv-00383-HCM-LRL, Document 21, 29 pages.

Sep. 5, 2017 (US) Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.

Sep. 29, 2017 (CA) Examination Report—App. 2,772,630.

Apr. 17, 2018 (US) Non-Final Office Action—U.S. Appl. No. 15/610,995.

Aug. 3, 2018 (US) Declaration of Kevin Jeffay, PhD in Support of Third Petition for Inter Partes Review of U.S. Pat. No. 9,137,205—IPR2018-01505.

Aug. 3, 2018 (US) Declaration of Kevin Jeffay, PhD in Support of Third Petition for Inter Partes Review of U.S. Pat. No. 9,560,077—IPR2018-01513.

Aug. 3, 2018 (US) Third Petition for Inter Partes Review of U.S. Pat. No. 9,137,205—IPR2018-01505.

Aug. 10, 2018 (US) Declaration of Kevin Jeffay, PhD in Support of Fourth Petition for Inter Partes Review of U.S. Pat. No. 9,137,205—IPR2018-01506.

Aug. 10, 2018 (US) Fourth Petition for Inter Partes Review of U.S. Pat. No. 9,137,205—IPR2018-01506.

Aug. 10, 2018 (US) Petition for Inter Partes Review of Claims 1-20 of U.S. Pat. No. 9,560,077—IPR2018-01513.

Aug. 15, 2018 (US) Declaration of Kevin Jeffay, PhD in Support of Petition for Inter Partes Review of U.S. Pat. No. 9,565,213—IPR2018-01512.

Aug. 15, 2018 (US) Declaration of Staurt Staniford, PhD in Support of Petition for Inter Partes Review of U.S. Pat. No. 9,686,193—IPR2018-01556.

Aug. 20, 2018 (US) Petition for Inter Partes Review of U.S. Pat. No. 9,565,213—IPR2018-01512.

Aug. 21, 2018 (US) Petition for Inter Partes Review of U.S. Pat. No. 9,686,193—IPR2018-01559.

Aug. 29, 2018 (CA) Office Action—App. 2,888,935.

Nov. 1, 2024, *Keysight Technologies, Inc.* v. *Centripetal Networks, LLC*, IPR 2022-01421 U.S. Pat. No. 10,681,009, Final Written Decision.

Sep. 23, 2024, *Keysight Technologies, Inc.* v. *Centripetal Networks, LLC*, IPR 2022-01421 U.S. Pat. No. 10,681,009, Oral Hearing Transcript.

\* cited by examiner

RULE SWAPPING IN A PACKET NETWORK

CROSS-REFERENCE TO RELATED APPLICATION

This application is a continuation of and claims priority to U.S. patent application Ser. No. 17/859,156, filed on Jul. 7, 2022 and entitled "RULE SWAPPING IN A PACKET NETWORK," which is a continuation of U.S. patent application Ser. No. 16/892,424, filed on Jun. 4, 2020 and entitled "RULE SWAPPING IN A PACKET NETWORK," which is a continuation of U.S. patent application Ser. No. 16/744,341, filed on Jan. 16, 2020, now U.S. Pat. No. 10,681,009, and entitled "RULE SWAPPING IN A PACKET NETWORK," which is a continuation of U.S. patent application Ser. No. 16/357,855, filed Mar. 19, 2019, now U.S. Pat. No. 10,541,972, and entitled "RULE SWAPPING IN A PACKET NETWORK," which is a continuation of U.S. patent application Ser. No. 15/610,995, now U.S. Pat. No. 10,284,522, filed Jun. 1, 2017, and entitled "RULE SWAPPING IN A PACKET NETWORK," which is a continuation of U.S. patent application Ser. No. 14/921,718, filed on Oct. 23, 2015, now U.S. Pat. No. 9,674,148 and entitled "RULE SWAPPING IN A PACKET NETWORK," which is a continuation of U.S. patent application Ser. No. 13/739,178, filed on Jan. 11, 2013, now U.S. Pat. No. 9,203,806, and entitled "RULE SWAPPING IN A PACKET NETWORK." The entire contents of which are incorporated by reference herein in their entireties and made part hereof.

This application is related to U.S. patent application Ser. No. 16/518,190, filed on Jul. 22, 2019, now U.S. Pat. No. 10,511,572, and entitled "RULE SWAPPING IN A PACKET NETWORK," the entire contents of which are incorporated by reference herein in its entirety and made part hereof.

BACKGROUND

Network protection devices (e.g., firewalls) implement rules with respect to packet-switched network traffic entering or leaving the networks they protect. Such devices compare the rules with the traffic. If a match is found, then the devices apply the actions associated with the rules to the traffic, e.g., the traffic may be allowed to cross the network boundary, or the traffic may be prevented from crossing the boundary. Such rules are often grouped into rule sets, which may form one or more network policies. As networks increase in complexity, the number of rules in a rule set may correspondingly increase. Similarly, the number of rules in a rule set may increase due to a desire on the part of an administrator to manage network traffic with a high level of granularity.

Network protection devices may require time to switch between rule sets. As rule sets increase in complexity, the time required for switching between them presents obstacles for effective implementation. For example, a network protection device may be unable to process network traffic while switching between rule sets due to the utilization of resources for implementing the new rule set. Additionally, while implementing a new rule set, a network protection device may continue processing packets in accordance with an outdated rule set. In certain circumstances (e.g., in the event of a network attack), such processing may exacerbate rather than mitigate the impetus for the rule set switch (e.g., the effect of the network attack).

SUMMARY

The following presents a simplified summary in order to provide a basic understanding of some aspects of the disclosure. It is neither intended to identify key or critical elements of the disclosure nor to delineate the scope of the disclosure. The following summary merely presents some concepts in a simplified form as a prelude to the description below.

In some variations, first and second rule sets may be received by a network protection device. The first and second rule sets may be preprocessed. For example, the first and second rule sets may be optimized to improve performance. The network protection device may be configured to process packets in accordance with the first rule set. Packets may be received by the network protection device. A first portion of the packets may be processed in accordance with the first rule set. The network protection device may be reconfigured to process packets in accordance with the second rule set. A second portion of the packets may be processed in accordance with the second rule set.

In some embodiments, the network protection device may include multiple processors. The processors, or a portion thereof, may be utilized for processing the first portion of the packets in accordance with the first rule set. Reconfiguring the network protection device to process packets in accordance with the second rule set may include synchronizing the processors. Synchronizing the processors may include signaling the processors to process packets in accordance with the second rule set. Responsive to signaling the processors to process packets in accordance with the second rule set, the processors may cease processing packets and may cache any unprocessed packets. The processors may be reconfigured to process packets in accordance with the second rule set. Once reconfigured, the processors may signal completion of the reconfiguration process. Responsive to signaling completion of the reconfiguration process, the processors may process the cached unprocessed packets in accordance with the second rule set.

In some embodiments, configuration information for configuring the network protection device to process packets in accordance with the first rule set may be stored. The stored configuration information may be utilized to reconfigure the network protection device to process packets in accordance with the first rule set, and a third portion of the packets may be processed in accordance with the first rule set.

In some embodiments, the first rule set may specify a set of network addresses for which packets should be forwarded and the second rule set may specify a set of network addresses for which packets should be forwarded. The second set of network addresses may include fewer network addresses than the first set. Alternatively, the second set of network addresses may include more network addresses than the first set.

In some embodiments, the first rule set may specify a set of network addresses for which packets should be dropped and the second rule set may specify a set of network addresses for which packets should be dropped. The second set of network addresses may include fewer network addresses than the first set. Alternatively, the second set of network addresses may include more network addresses than the first set.

In some embodiments, reconfiguring the network protection device to process packets in accordance with the second rule set may be performed in response to the network protection device receiving a message invoking the second rule set. Additionally or alternatively, reconfiguring the network protection device to process packets in accordance with the second rule set may be performed in response to one or more detected network conditions indicating a network attack.

Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. These connections are general and, unless specified otherwise, may be direct or indirect, wired or wireless, physical or logical. In this respect, the specification is not intended to be limiting.

Figure 1:
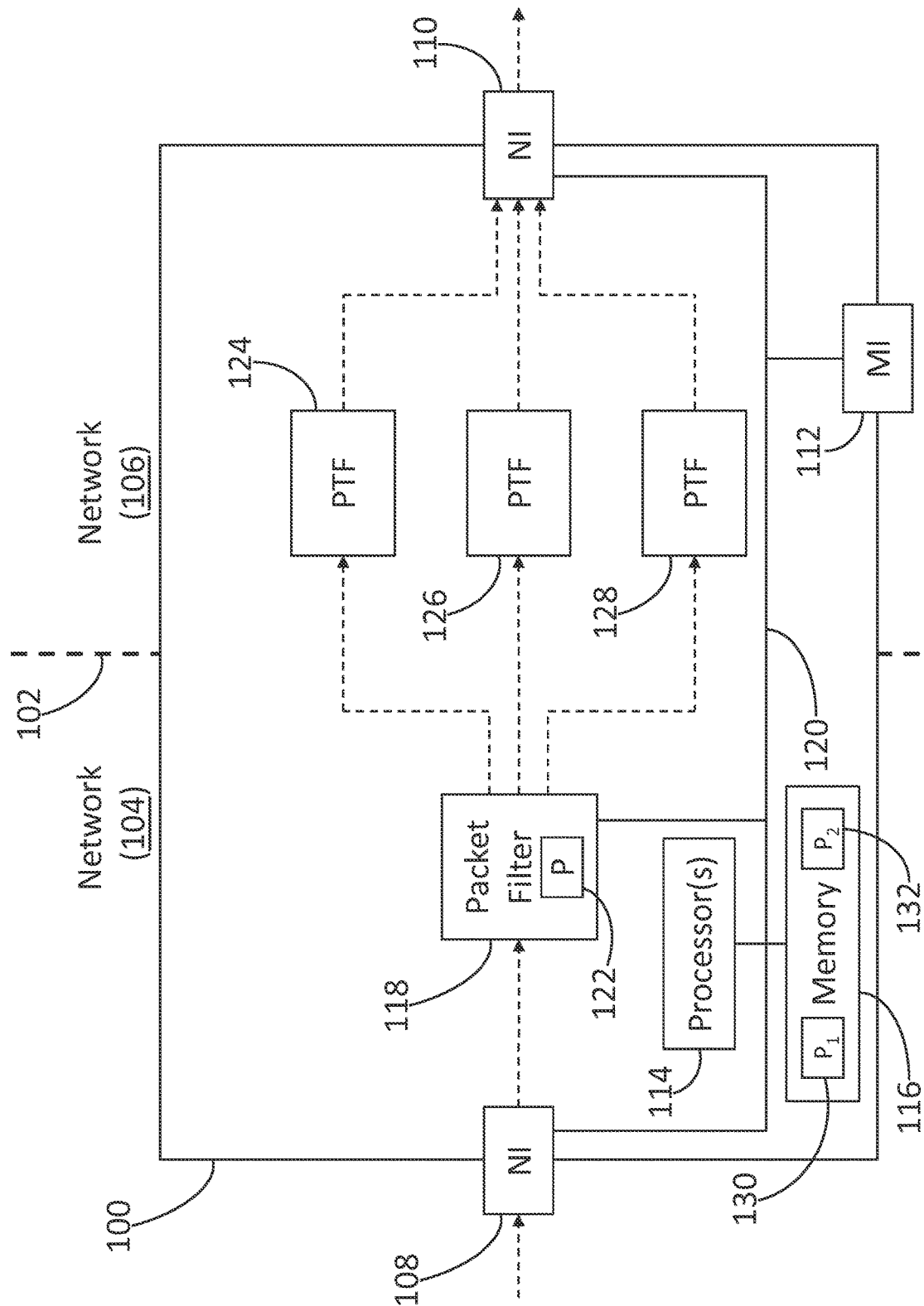
FIG. 1 illustrates an exemplary network protection device in which one or more aspects of the disclosure may be implemented.

FIG. 1 illustrates an exemplary network protection device in which one or more aspects of the disclosure may be implemented. Referring to FIG. 1, network protection device 100 may be located at boundary 102 between networks 104 and 106. As used herein, a network protection device includes any computing device having a processor, a memory, and a communication interface. Optionally, a network protection device may be configured to perform one or more additional functions as described herein. For example, network protection device 100 may be a firewall, gateway, router, or switch that interfaces networks 104 and 106. Network protection device 100 may include one or more network interfaces. For example, network protection device 100 may include network interface 108 for communicating with network 104, and network interface 110 for communicating with network 106. In some embodiments, network protection device 100 may include a management interface for providing an administrator with configuration access or provisioning network protection device 100 with one or more rule sets. For example, network protection device 100 may include management interface 112.

Network protection device 100 may also include one or more processors 114, memory 116, and packet filter 118. Network interfaces 108 and 110, management interface 112, processor(s) 114, memory 116, and packet filter 118 may be interconnected via data bus 120. Packet filter 118 may be configured to examine information specified by policy 122 with respect to packets received by network protection device 100 and forward the packets to one or more packet transformation functions specified by policy 122 based on the examined information. As used herein, a policy includes any combination of rules, rule sets, messages, instructions, files, data structures, or the like that specifies criteria corresponding to one or more packets and identifies a packet transformation function to be performed on packets corresponding to the specified criteria. Optionally, a policy may further specify one or more additional parameters as described herein.

Packet filter 118 may examine information specified by policy 122 with respect to packets received by network protection device 100 (e.g., packets received from network 104 via network interface 108) and forward the packets to one or more of packet transformation functions 124, 126, or 128 specified by policy 122 based on the examined information. Packet transformation functions 124, 126, and 128 may be configured to perform one or more functions on packets they receive from packet filter 118. For example, one or more of packet transformation functions 124, 126, and 128 may be configured to forward packets received from packet filter 118 into network 106, forward packets received from packet filter 118 to an Internet Protocol Security (IPsec) stack having an IPsec security association corresponding to the packets, or drop packets received from packet filter 118. Additionally or alternatively, one or more of packet transformation functions 124, 126, and 128 may be configured to forward one or more packets they receive to one or more other packet transformation functions (e.g., packet transformation function 124, 126, or 128), which may, in turn, perform one or more additional functions on the packets (e.g., log the packets, forward the packets into network 106, drop the packets, or forward the packets to one or more additional packet transformation functions for further processing). In some embodiments, one or more of packet transformation functions 124, 126, and 128 may be configured to drop packets by sending the packets to a local "infinite sink" (e.g., the/dev/null device file in a UNIX/LINUX system). U.S. patent application Ser. No. 13/657,010, filed Oct. 22, 2012, describes the use of packet transformation functions and is incorporated by reference herein in its entirety.

As indicated above, network protection devices (e.g., network protection device 100) may require time to switch between rule sets, and, as rule sets increase in complexity, the time required for switching between them may present obstacles for effective implementation. For example, memory 116 may include policies 130 and 132. Each of policies 130 and 132 may include a rule set. In some embodiments, memory 116 may store policies 130 and 132's rule sets in one or more buffers. The buffers may be statically sized to one or more predetermined sizes or the size of the buffers may be dynamically adjusted based on the size of policies 130 and 132's rule sets. In order to optimize network protection device 100's implementation of policies 130 and 132 the rule set contained within policy 130 or policy 132 may be preprocessed prior to its implementation by network protection device 100. For example, recent advances in packet filtering technology have reduced the time required to apply large rule sets to network traffic. United States Patent Application Publication Nos. 2006/0195896 and 2006/0248580 to Fulp et al., and United States Patent Application Publication No. 2011/0055916 to Ahn, describe such advanced packet filtering technologies, and are each incorporated by reference herein in their entireties. In some embodiments, preprocessing policies 130 and 132's rule sets may include merging two or more rules within the rule sets into one rule, separating one or more rules within the rule sets into two or more rules, or reordering one or more rules within the rule sets.

While preprocessing a rule set prior to its implementation may optimize its application to packets, preprocessing a rule set may be a resource intensive process that may require a substantial period of time. In certain contexts (e.g., initial setup) the time required for preprocessing may be of little moment; however, in other contexts (e.g., when rule sets are being swapped live), the time required for preprocessing a rule set may adversely affect the performance of network protection device 100. For example, network protection device 100 may preprocess policy 130's rule set and then implement the preprocessed rule set with respect to network traffic flowing between networks 104 and 106. Later, it may be desired to reconfigure network protection device 100 to implement policy 132's rule set with respect to network traffic flowing between networks 104 and 106. Accordingly, policy 132's rule set may be preprocessed and network protection device 100 may be reconfigured to implement the preprocessed rule set with respect to network traffic flowing between networks 104 and 106. Utilizing such an approach, however, may result in network protection device 100 having to devote resources to preprocessing policy 132's rule set while simultaneously implementing policy 130's rule set with respect to traffic flowing between networks 104 and 106. Thus, network protection device 100 may have to wait until preprocessing of policy 132's rule set is completed before switching to policy 132. Moreover, this period may be extended due to network protection device 100's ongoing implementation of policy 130's rule set with respect to traffic flowing between networks 104 and 106.

Figure 2:
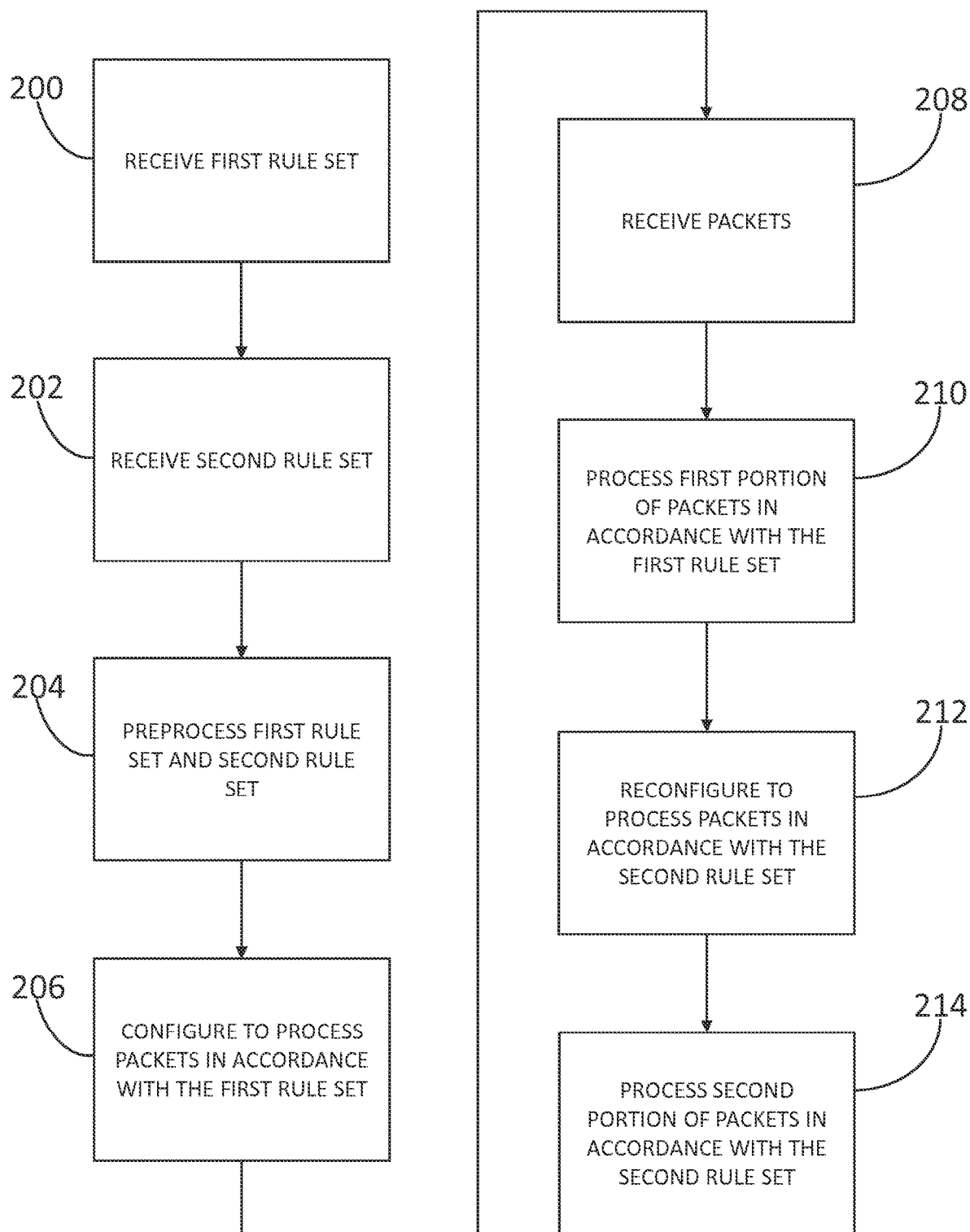
FIG. 2 illustrates an exemplary method for performing fast rule swapping.

In accordance with aspects of the disclosure, network protection device 100 may be configured to preprocess multiple rule sets prior to their implementation and thereby enable network protection device 100 to perform fast rule swapping between rule sets. FIG. 2 illustrates an exemplary method for performing fast rule swapping. Referring to FIG. 2, the steps may be performed by a network protection device, such as network protection device 100. At step 200, a first rule set may be received. For example, network protection device 100 may receive policy 130 via management interface 112. At step 202, a second rule set may be received. For example, network protection device 100 may receive policy 132 via management interface 112. At step 204, the first and second rule sets may be preprocessed. For example, network protection device 100 may preprocess both policy 130's rule set and policy 132's rule set. At step 206, the network protection device may be configured to process packets in accordance with the first rule set. For example, network protection device 100 may be configured to process packets flowing between networks 104 and 106 in accordance with policy 130's preprocessed rule set. At step 208, packets may be received. For example, network protection device 100 may receive packets from network 104 via network interface 108. At step 210, a first portion of the packets may be processed in accordance with the first rule set. For example, network protection device 100 may perform one or more packet transformation functions specified by policy 130's preprocessed rule set on a first portion of the packets received from network 104. At step 212, the network protection device may be reconfigured to process packets in accordance with the second rule set. For example, network protection device 100 may be reconfigured to process packets flowing between networks 104 and 106 in accordance with policy 132's preprocessed rule set. At step 214, a second portion of the packets may be processed in accordance with the second rule set. For example, network protection device 100 may perform one or more packet transformation functions specified by policy 132's preprocessed rule set on a second portion of the packets received from network 104.

It will be appreciated that by preprocessing both policy 130's rule set and policy 132's rule set prior to processing packets flowing between networks 104 and 106 in accordance with either of policy 130's rule set or policy 132's rule set, network protection device 100 may swap or switch between policy 130's rule set and policy 132's rule set more efficiently. For example, because policy 132's rule set is preprocessed prior to network protection device 100 being reconfigured to process packets in accordance with policy 132's rule set, network protection device 100 is not required to preprocess policy 132's rule set at the time network protection device 100 is switching between policy 130's rule set and policy 132's rule set. Moreover, network protection device 100 may be able to preprocess policy 132's rule set more efficiently because it may not be required to simultaneously process packets in accordance with policy 130's rule set.

In some embodiments, network protection device 100 may be configured to store configuration information associated with policy 130's rule set or policy 132's rule set. Such configuration information may later be utilized to reconfigure network protection device 100 to process packets in accordance with policy 130's rule set or policy 132's rule set (e.g., to swap or switch back to processing packets in accordance with a rule set network protection device 100 has previously processed packets in accordance with).

Due to the large number of rules a rule set may contain and the high volume of traffic a network protection device may be required to efficiently process, a network protection device may include multiple processors for processing packets in accordance with a rule set. Such a multi-processor network protection device may distribute packets amongst its processors for processing in accordance with a rule set.

Figure 3A:
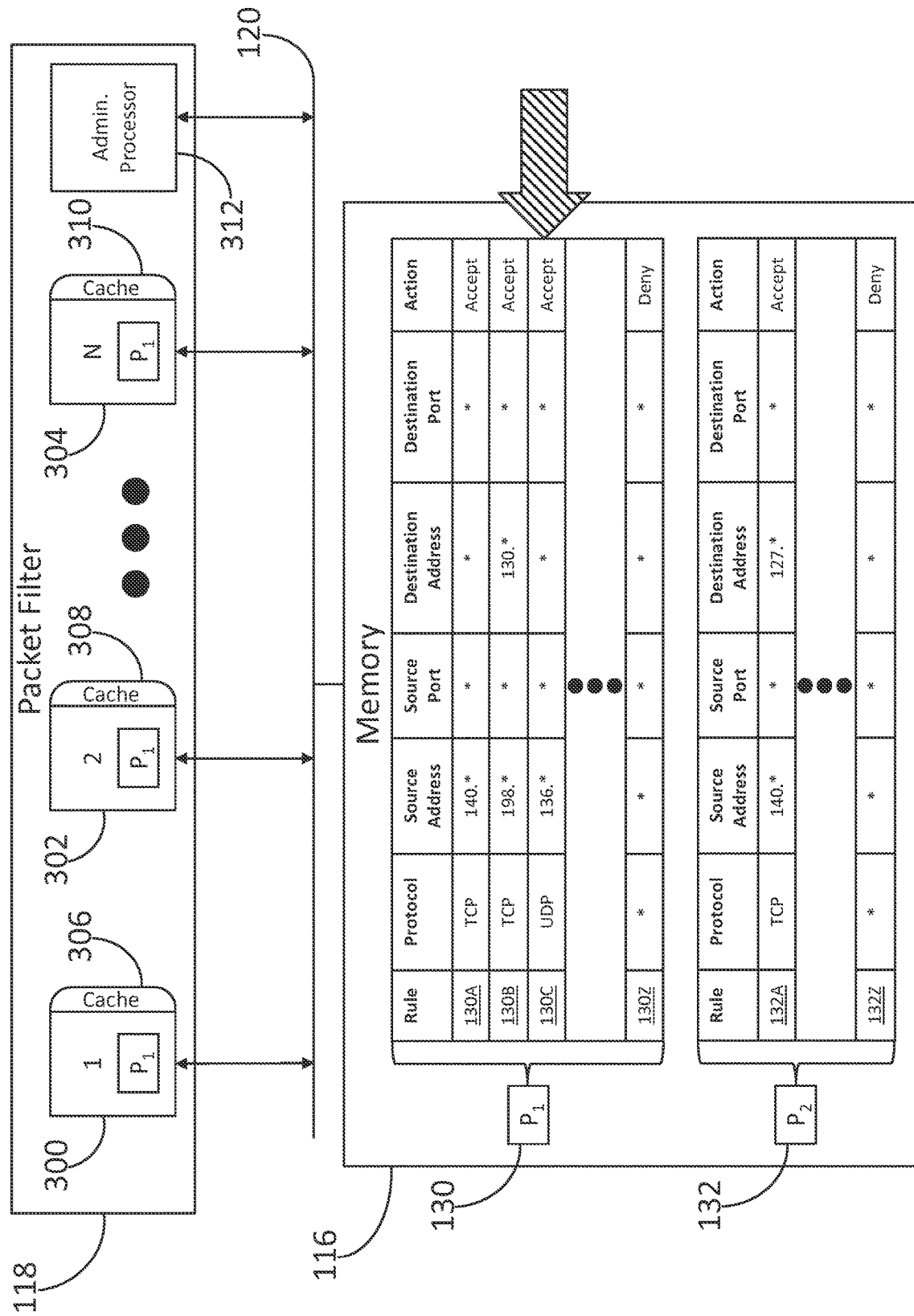
FIGS. 3A-3F illustrate aspects of an exemplary network protection device synchronizing multiple processors performing fast rule swapping.

FIGS. 3A-3F illustrate aspects of an exemplary network protection device synchronizing multiple processors performing fast rule swapping. Referring to FIG. 3A, as indicated above, network protection device 100 may include packet filter 118. Packet filter 118 may include one or more processor(s). For example, packet filter 118 may include processors 300, 302, and 304. Each of processors 300, 302, and 304 may be associated with a memory cache. For example, processor 300 may be associated with cache 306. Similarly, processor 302 may be associated with cache 308 and processor 304 may be associated with cache 310. Packet filter 118 may further include one or more administrative processors for controlling or coordinating its processors. For example, packet filter 118 may include administrative processor 312 for controlling or coordinating processors 300, 302, and 304. As indicated above, network protection device 100 may be configured to swap or switch between processing packets in accordance with one rule set to processing packets in accordance with a different rule set. In multi-processor embodiments, it may be advantageous to synchronize the processors involved in processing packets in accordance with the rule sets. For example, policy 130's rule set may include rules 130A, 130B, and 130C-130Z; and policy 132's rule set may include rules 132A-132Z. It will be appreciated, that either or both of policies 130 and 132's rule sets may include more than the number of rules illustrated (e.g., either or both of policies 130 and 132's rule sets may include hundreds of thousands or millions of individual rules).

Each of the individual rules within either of policies 130 or 132's rule sets may specify criteria (e.g., a set of network addresses) and an action (e.g., accept or deny) to be performed on packets matching the specified criteria. For example, rule 130A may specify that packets containing TCP packets, originating from a source IP address that begins with 140, having any source port, destined for any IP address, and destined for any port should have an accept packet transformation function performed on them. Similarly, rule 130B may specify that packets containing TCP packets, originating from a source IP address that begins with 198, having any source port, destined for an IP address that begins with 130, and destined for any port should have an accept packet transformation function performed on them; rule 130C may specify that packets containing UDP packets, originating from a source IP address that begins with 136, having any source port, destined for any IP address, and destined for any port should have an accept packet transformation function performed on them; rule 130Z may specify that packets containing packets of any protocol, originating from any IP source address, having any source port, destined for any IP address, and destined for any port should have a deny packet transformation function performed on them; rule 132A may specify that packets containing TCP packets, originating from a source IP address that begins with 140, having any source port, destined for any IP address than begins with 127, and destined for any port should have an accept packet transformation function performed on them; and rule 132Z may specify that packets containing packets of any protocol, originating from any IP source address, having any source port, destined for any IP address, and destined for any port should have a deny packet transformation function performed on them.

The individual rules of policies 130 and 132's rule sets may execute in a linear fashion. That is, a packet being processed in accordance with policy 130's rule set may first be compared to the criteria specified by rule 130A. If the packet matches the criteria specified by rule 130A, the corresponding action may be performed on the packet and packet filter 118's processor(s) may move on to the next packet. If the packet does not match the criteria specified by rule 130A, then the packet is compared to the criteria specified by the next rule (e.g., rule 130B), and so on, until the packet matches the criteria specified by a rule and the corresponding action is performed on the packet. Thus, for a multi-processor network protection device, individual processors may be comparing different individual packets to different rules within a given rule set when it is determined that the network protection device should swap or switch the rule set the packets are being processed in accordance with.

For example, at a time when it is determined that network protection device 100 should swap or switch from processing packets in accordance with policy 130's rule set to processing packets in accordance with policy 132's rule set, processor 300 may be beginning to process a packet than does not match the criteria of any of policy 130's rule set's rules other than rule 130Z. Thus, processor 300 may be required to compare the packet being processed to a large number of additional rules—potentially millions—before reaching the rule whose criteria the packet will match (e.g., rule 130Z). In contrast, at the time it is determined that network protection device 100 should swap or switch from processing packets in accordance with policy 130's rule set to processing packets in accordance with policy 132's rule set, processor 302 may be beginning to process a packet that matches the criteria specified by rule 130A, and will therefore process the packet relatively quickly compared to processor 300. Thus, if processors 300 and 302 each reconfigure to process packets in accordance with policy 132's rule set upon completion of processing their respective packets, processor 302 may begin processing packets in accordance with policy 132's rule set while processor 300 continues to process packets in accordance with policy 130's rule set. Accordingly, it may be advantageous to synchronize processors 300, 302, and 304's implementation of policy 132's rule set.

Figure 3B:
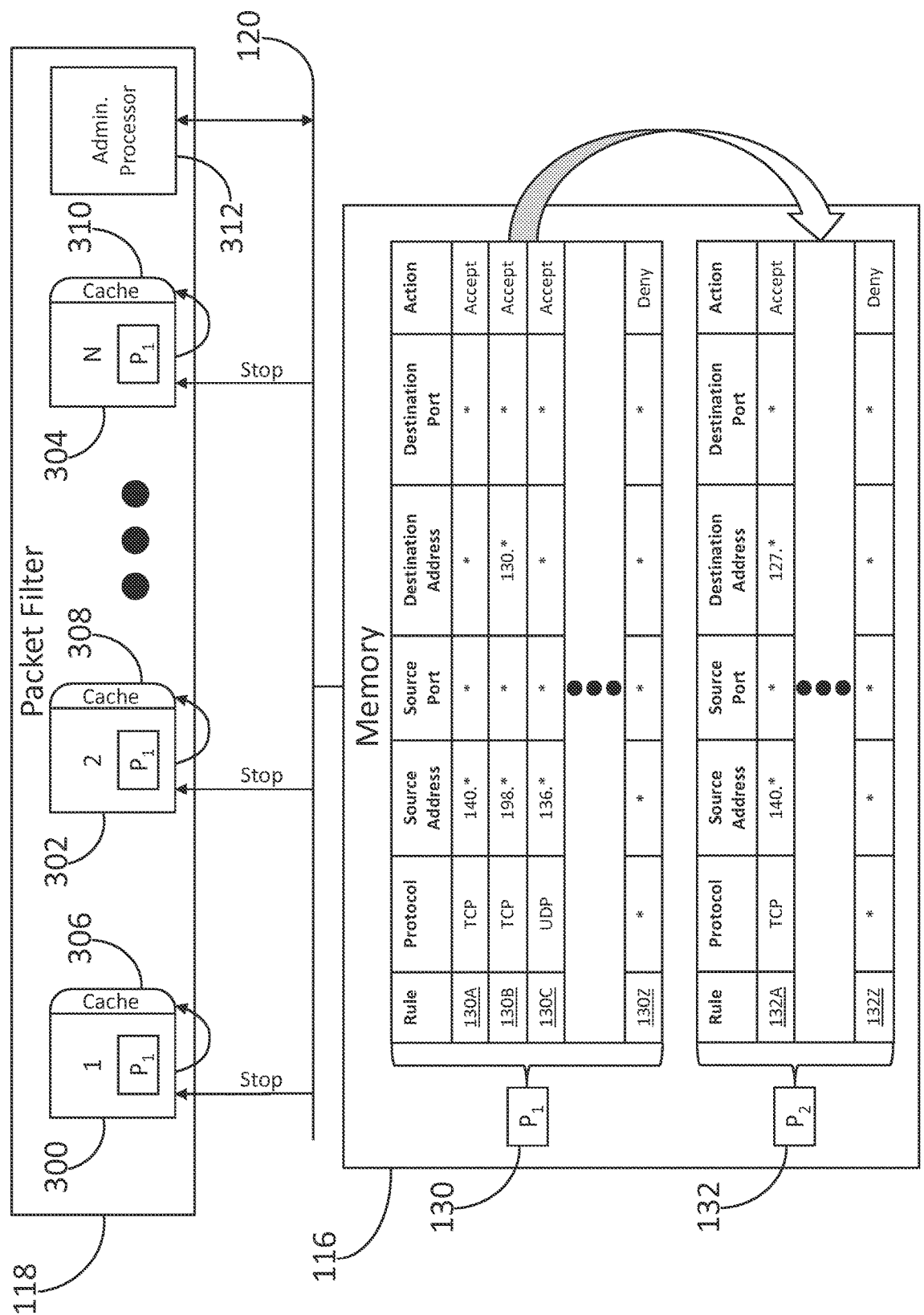

Referring to FIG. 3B, when it is determined that network protection device 100 should swap or switch from processing packets in accordance with policy 130's rule set to processing packets in accordance with policy 132's rule set, each of processors 300, 302, and 304 may be signaled by administrative processor 312 (e.g., via data bus 120) to stop processing packets. In some embodiments, processors 300, 302, and 304 may be signaled via the same channel over which they receive packets (e.g., data bus 120). For example, a control packet, indicting the policy swap, may be sent to each of processors 300, 302, and 304. In some embodiments, such a control packet may comprise a header value (e.g., a negative integer) that would not exist in a real network packet (e.g., a packet received from network 104). Additionally or alternatively, packets sent to processors 300, 302, and 304 may be encapsulated within meta packets and the meta packets may include information indicating whether they are control packets (e.g., packets indicating that processors 300, 302, and 304 should swap from processing packets in accordance with policy 130's rule set to processing packets in accordance with policy 132's rule set) or packets containing real network packets (e.g., packets received from network 104).

In some embodiments, each of processors 300, 302, and 304 may finish processing the packet they are currently processing and then cease processing packets. In other embodiments, each of processors 300, 302, and 304 may cease processing packets and cache the packet they are currently processing for future processing in accordance with policy 132's rule set. In any of the aforementioned embodiments, once a processor has ceased processing packets, it may cache any additional packets for future processing in accordance with policy 132's rule set. For example, processor 300 may cache any unprocessed packets in cache 306. Similarly, processor 302 may cache any unprocessed packets in cache 308 and processor 304 may cache any unprocessed packets in cache 310.

Figure 3C:
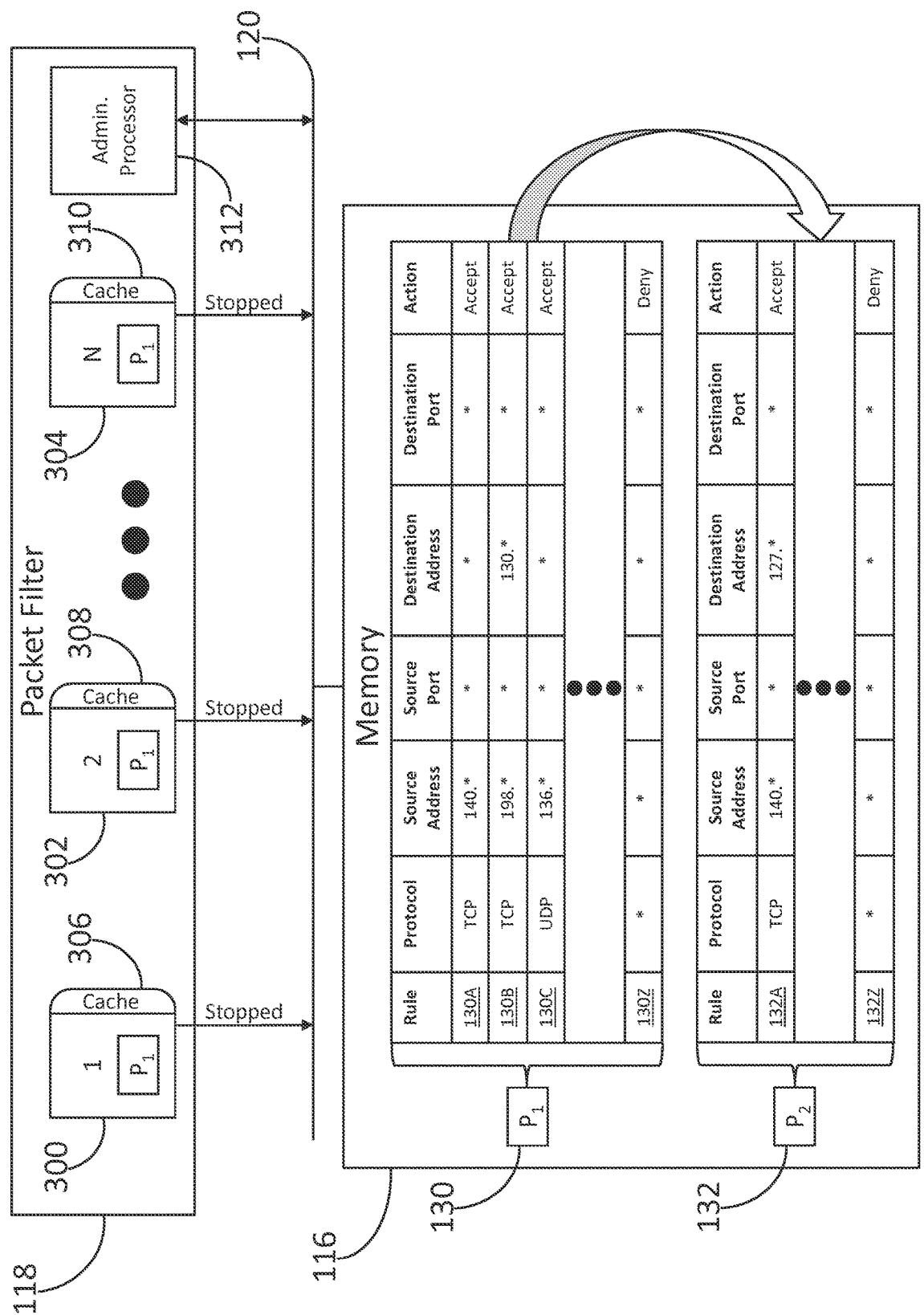
Figure 3D:
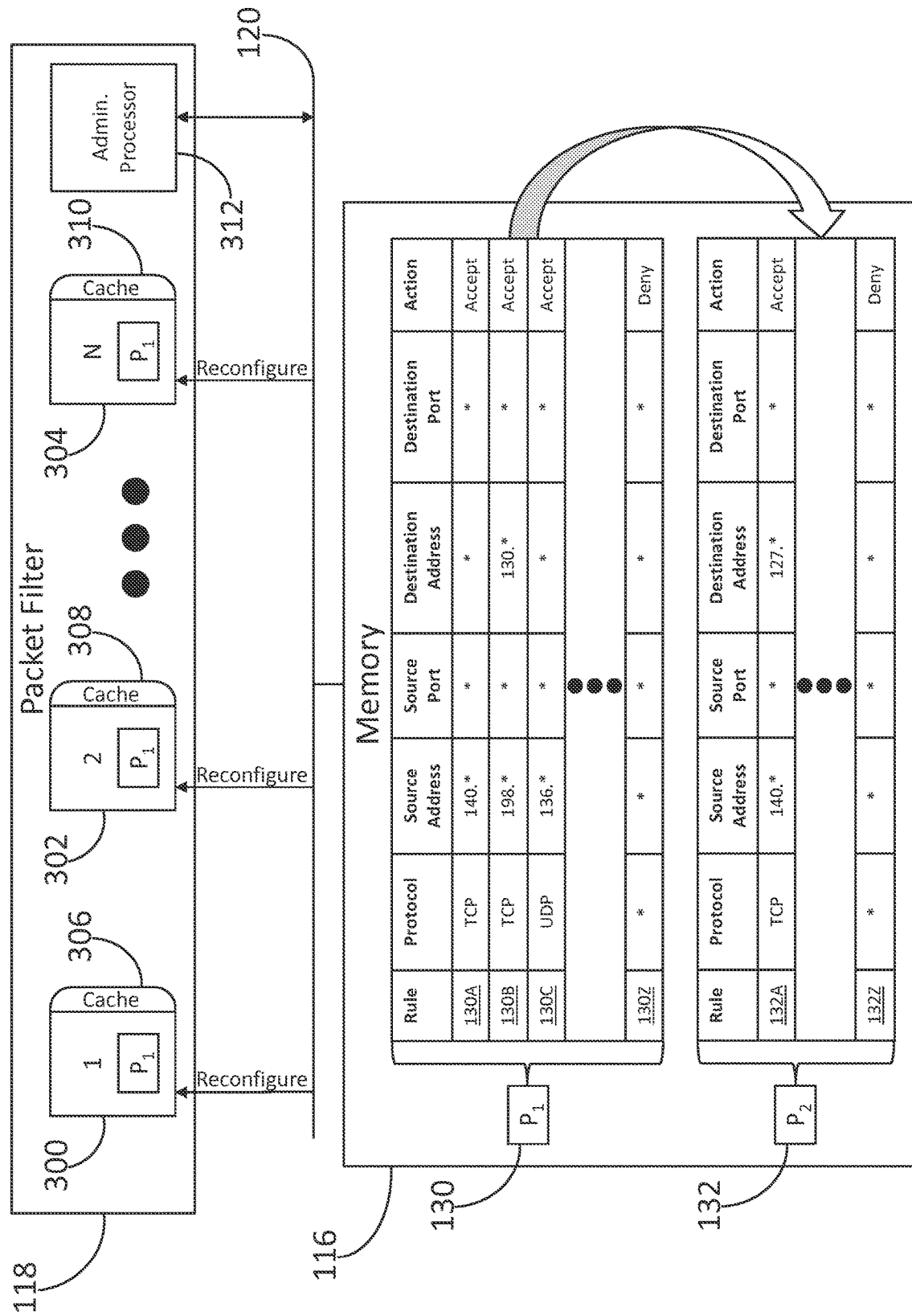
Figure 3E:
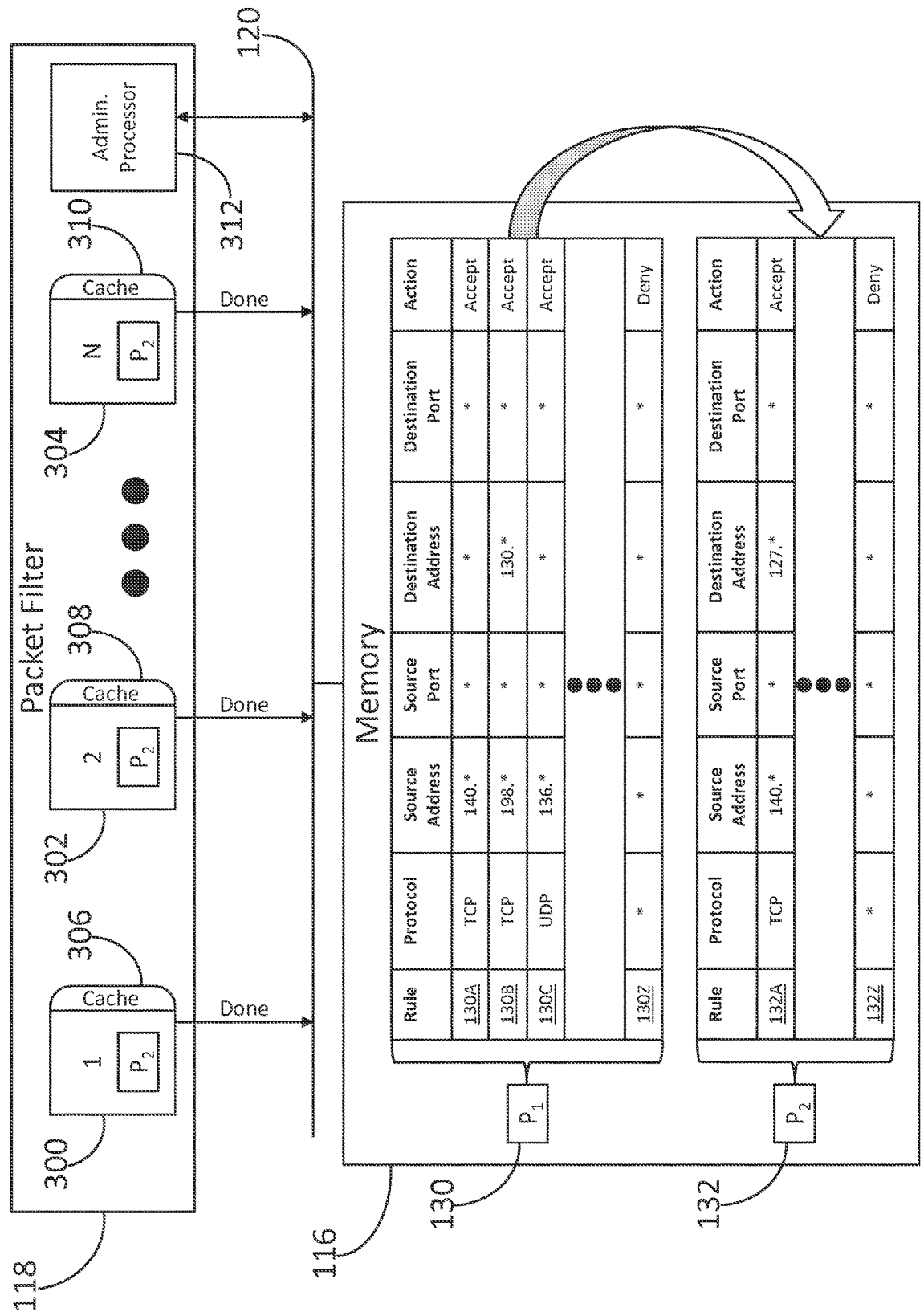
Figure 3F:
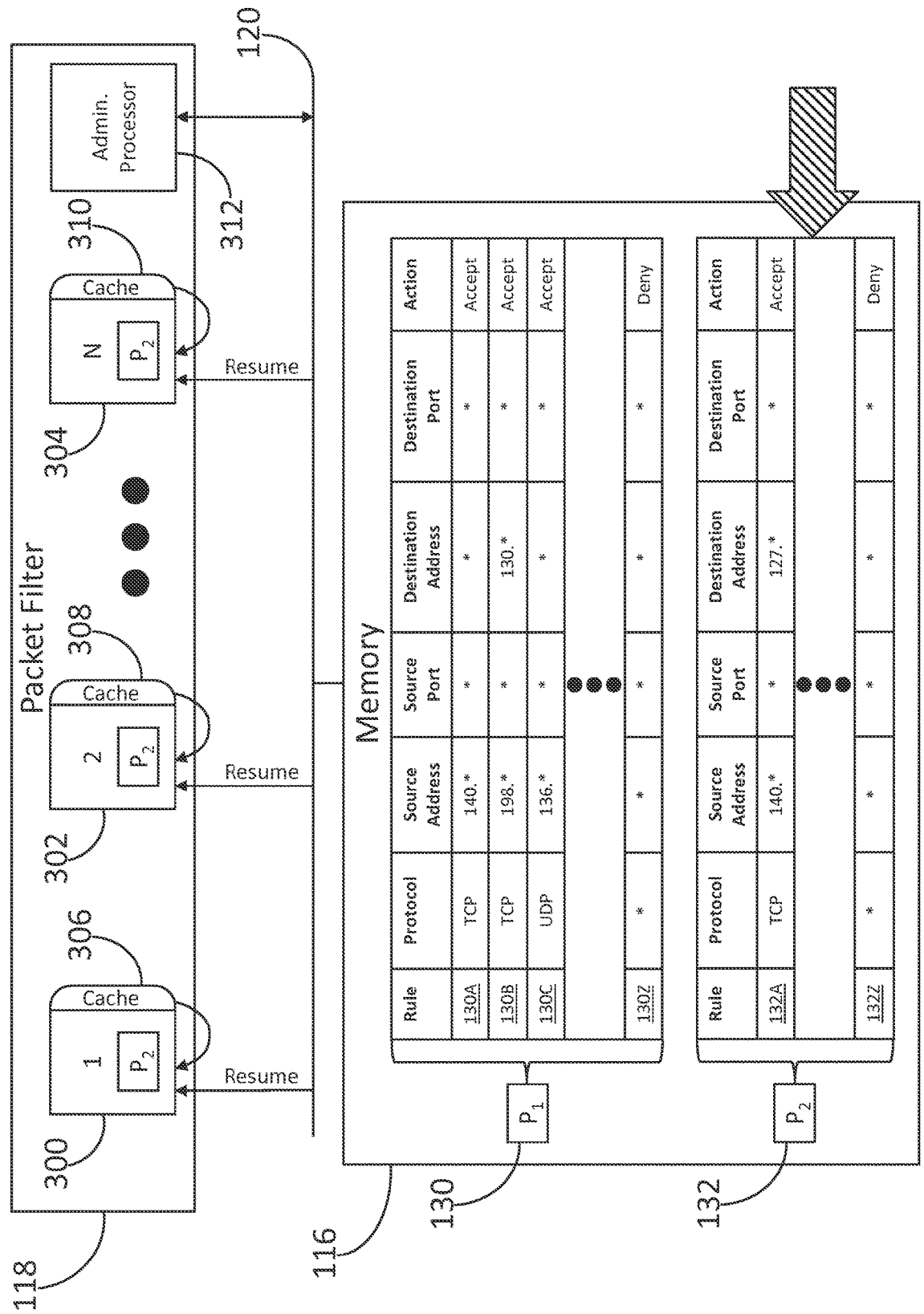

Referring to FIG. 3C, upon ceasing to process packets (e.g., when a current packet has been examined against the rules in policy 130's rule set), each of processors 300, 302, and 304 may signal administrative processor 312 that they have stopped processing packets. Referring to FIG. 3D, once each of processors 300, 302, and 304 have signaled that they have stopped processing packets, each of processors 300, 302, and 304 may be reconfigured to process packets in accordance with policy 132's rule set. Referring to FIG. 3E, once reconfigured to process packets in accordance with policy 132's rule set, each of processors 300, 302, and 304 may signal administrative processor 312 that they have been successfully reconfigured. Referring to FIG. 3F, once each of processors 300, 302, and 304 have signaled that they have been successfully reconfigured, each of processors 300, 302, and 304 may resume processing packets. For example, processors 300, 302, and 304 may begin by processing any packets respectively stored in caches 306, 308, and 310, and then may process additional packets received from network 104 via network interface 108.

By synchronizing the implementation of policy 132's rule set across processors 300, 302, and 304, packets processed by network protection device 100 at any given time may receive uniform treatment irrespective of the particular processor which handles them. Because both policy 130's rule set and policy 132's rule set may be preprocessed prior to processing any packets in accordance with either of policies 130 or 132's rule sets, the time required to reconfigure network protection device 100 to process packets in accordance with policy 132's rule set may be reduced. Reducing the time required to swap or switch between processing packets in accordance with policy 130's rule set and policy 132's rule set may be particularly advantageous in certain contexts. For example, policy 130's rule set may specify a set of network address for which packets should be accepted (e.g., a set of network addresses corresponding to devices for which communications should be supported under normal network conditions) and that all other packets should be denied. Policy 132's rule set may specify a smaller set of network addresses for which packets should be accepted than that specified by policy 130's rule set (e.g., a set of network addresses corresponding to devices for which communications should be supported under demanding network conditions), and may further specify that all other packets should be denied. In the event of a network attack (e.g., a Distributed Denial-of-Service (DDoS) attack) or detection of one or more network conditions indicating a network attack, network protection device 100 may switch from processing packets in accordance with policy 130's rule set to processing packets in accordance with policy 132's rule set (e.g., in an effort to mitigate the effects of the attack). Accordingly, the faster network protection device 100 can switch from processing packets in accordance with policy 130's rule set to processing packets in accordance with policy 132's rule set, the greater the likelihood that the effects of the attack may be mitigated.

Figure 4:
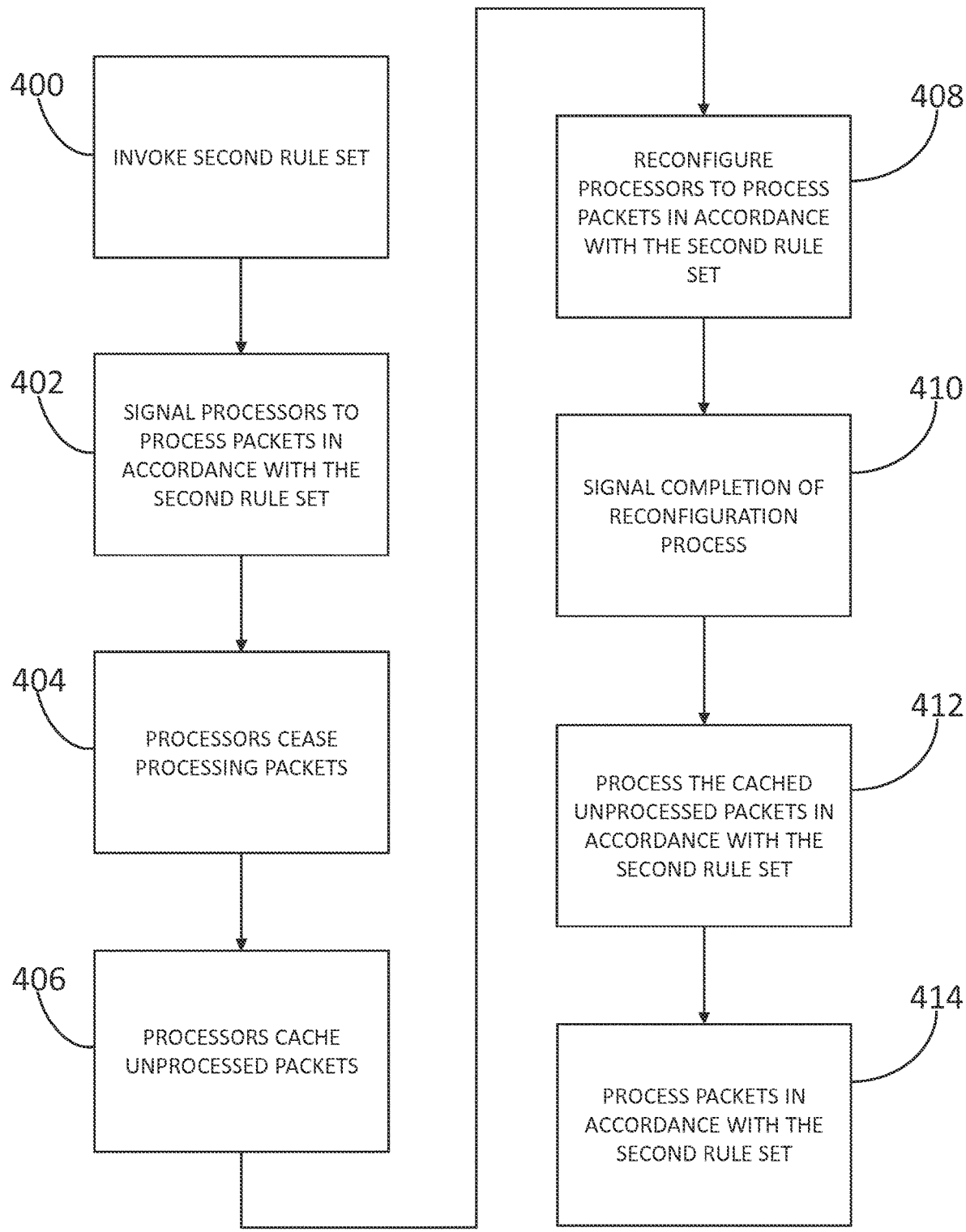
FIG. 4 illustrates an exemplary method for synchronizing multiple processors performing fast rule swapping.

FIG. 4 illustrates an exemplary method for synchronizing multiple processors performing fast rule swapping. Referring to FIG. 4, the steps may be performed by a network protection device, such as network protection device 100. At step 400, the second rule set may be invoked. For example, network protection device 100 may receive a message invoking policy 132's rule set or one or more network conditions indicating a network attack may be detected. At step 402, one or more of the network protection device's processors responsible for processing packets may be signaled to process packets in accordance with the second rule set. For example, processors 300, 302, and 304 may be signaled to process packets in accordance with policy 132's rule set. At step 404, the one or more processors of the network protection device responsible for processing packets may cease processing packets. For example, each of processors 300, 302, and 304 may cease processing packets in accordance with policy 300's rule set. At step 406, the one or more processors of the network protection device responsible for processing packets may cache any unprocessed packets. For example, each of processors 300, 302, and 304 may respectively cache any unprocessed packets in caches 306, 308, and 310. At step 408, the one or more processors of the network protection device responsible for processing packets may be reconfigured to process packets in accordance with the second rule set. For example, each of processors 300, 302, and 304 may be reconfigured to process packets in accordance with policy 132's rule set. At step 410, the one or more processors of the network protection device responsible for processing packets may signal completion of the reconfiguration process. For example, each of processors 300, 302, and 304 may signal completion of their respective reconfiguration processes. At step 412, the one or more processors of the network protection device responsible for processing packets may process any cached unprocessed packets in accordance with the second rule set. For example, each of processors 300, 302, and 304 may respectively process any unprocessed packets previously cached in caches 306, 308, and 310 in accordance with policy 132's rule set. At step 414, additional packets may be processed in accordance with the second rule set. For example, each of processors 300, 302, and 304 may process additional packets received from network 104 in accordance with policy 132's rule set.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing servers and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional.

The invention claimed is:
1. A method comprising:
configuring a packet filtering device to process packets in accordance with a first set of packet filtering rules;
receiving, by the packet filtering device, a first plurality of packets after configuring the packet filtering device to process packets in accordance with the first set of packet filtering rules;

beginning processing, by the packet filtering device, the first plurality of packets in accordance with the first set of packet filtering rules;

receiving, by the packet filtering device, a second set of packet filtering rules;

preprocessing, by the packet filtering device and during processing of the first plurality of packets in accordance with the first set of packet filtering rules, the second set of packet filtering rules by performing operations on the second set of packet filtering rules, prior to the second set of packet filtering rules being implemented on the packet filtering device, to optimize performance of the packet filtering device, wherein the packet filtering device does not process packets using the second set of packet filtering rules while preprocessing the second set of packet filtering rules;

in response to receiving a signal to process packets in accordance with the second set of packet filtering rules:

ceasing processing, by the packet filtering device, of the first plurality of packets, wherein a first portion of the first plurality of packets has completed processing in accordance with the first set of packet filtering rules and a second portion of the first plurality of packets has not completed processing in accordance with the first set of packet filtering rules;

temporarily storing, by the packet filtering device, the second portion of the first plurality of packets;

reconfiguring the packet filtering device to process packets in accordance with the second set of packet filtering rules; and responsive to receiving one or more signals indicating that reconfiguration of the packet filtering device to process packets in accordance with the second set of packet filtering rules has completed, processing, by the packet filtering device, the second portion of the first plurality of packets and a second plurality of unprocessed packets in accordance with the second set of packet filtering rules.

2. The method of claim 1, further comprising:
detecting one or more network conditions indicating an attack, wherein the signal to process packets in accordance with the second set of packet filtering rules is based on detecting the one or more network conditions.

3. The method of claim 1, wherein preprocessing the second set of packet filtering rules comprises at least one of:
merging a first rule and a second rule into a single rule;
separating a third rule into a plurality of rules; or
reordering one or more rules in the second set of packet filtering rules.

4. The method of claim 1, further comprising:
storing, by the packet filtering device, the first set of packet filtering rules and the second set of packet filtering rules in a memory buffer; and
adjusting, by the packet filtering device, a size of the memory buffer based on at least one of a size of the first set of packet filtering rules and a size of the second set of packet filtering rules.

5. The method of claim 1, wherein the second set of packet filtering rules is received after processing the first portion of the first plurality of packets in accordance with the first set of packet filtering rules.

6. The method of claim 1, wherein the second set of packet filtering rules are received before processing of the first portion of the first plurality of packets in accordance with the first set of packet filtering rules.

7. The method of claim 1, wherein the second plurality of unprocessed packets are received after configuring the packet filtering device to process packets in accordance with the second set of packet filtering rules.

8. The method of claim 1, wherein temporarily storing the second portion of the first plurality of packets and the second plurality of unprocessed packets further comprises caching the second portion of the first plurality of packets and the second plurality of unprocessed packets.

9. The method of claim 1, wherein the one or more signals indicating that reconfiguration of the packet filtering device to process packets in accordance with the second set of packet filtering rules has completed are received from each processor, of one or more processors associated with the packet filtering device, prior to processing packets in accordance with the second set of packet filtering rules.

10. The method of claim 1, further comprising:
ceasing processing, after receiving one or more signals indicating that reconfiguration of the packet filtering device to process packets in accordance with the second set of packet filtering rules has completed, packets in accordance with the first set of packet filtering rules.

11. A packet filtering device comprising:
one or more processors; and
memory comprising instructions that, when executed by the one or more processors, cause the packet filtering device to:
configure the packet filtering device to process packets in accordance with a first set of packet filtering rules;
receive a first plurality of packets after configuring the packet filtering device to process packets in accordance with the first set of packet filtering rules;
begin processing the first plurality of packets in accordance with the first set of packet filtering rules;
receive a second set of packet filtering rules;
preprocess, during processing of the first plurality of packets in accordance with the first set of packet filtering rules, the second set of packet filtering rules by performing operations on the second set of packet filtering rules, prior to the second set of packet filtering rules being implemented on the packet filtering device, to optimize performance of the packet filtering device, wherein the packet filtering device does not process packets using the second set of packet filtering rules while preprocessing the second set of packet filtering rules;
in response to receiving a signal to process packets in accordance with the second set of packet filtering rules:
cease processing of the first plurality of packets, wherein a first portion of the first plurality of packets has completed processing in accordance with the first set of packet filtering rules and a second portion of the first plurality of packets has not completed processing in accordance with the first set of packet filtering rules;
temporarily store the second portion of the first plurality of packets;
reconfigure the packet filtering device to process packets in accordance with the second set of packet filtering rules; and
responsive to receiving one or more signals indicating that reconfiguration of the packet filtering device to process packets in accordance with the second set of packet filtering rules has completed, process the second portion of the first plurality of packets and a second plurality of unprocessed packets in accordance with the second set of packet filtering rules.

12. The packet filtering device of claim 11, wherein the instructions, when executed by the one or more processors, cause the packet filtering device to:
  detect one or more network conditions indicating an attack, wherein the signal to process packets in accordance with the second set of packet filtering rules is based on detecting the one or more network conditions.

13. The packet filtering device of claim 11, wherein the instructions, when executed by the one or more processors, cause the packet filtering device to preprocess the second set of packet filtering rules by at least one of:
  merging a first rule and a second rule into a single rule;
  separating a third rule into a fourth rule and a fifth rule; or
  reordering one or more rules in the second set of packet filtering rules.

14. The packet filtering device of claim 11, wherein the instructions, when executed by the one or more processors, cause the packet filtering device to:
  store the first set of packet filtering rules and the second set of packet filtering rules in a memory buffer; and
  adjust a size of the memory buffer based on at least one of a size of the first set of packet filtering rules and a size of the second set of packet filtering rules.

15. The packet filtering device of claim 11, wherein the second set of packet filtering rules is received after processing the first portion of the first plurality of packets in accordance with the first set of packet filtering rules.

16. The packet filtering device of claim 11, wherein the second set of packet filtering rules are received before processing of the first portion of the first plurality of packets in accordance with the first set of packet filtering rules.

17. The packet filtering device of claim 11, wherein the second plurality of unprocessed packets are received after configuring the packet filtering device to process packets in accordance with the second set of packet filtering rules.

18. The packet filtering device of claim 11, wherein the instructions, when executed by the one or more processors, cause the packet filtering device to temporarily store the second portion of the first plurality of packets and the second plurality of unprocessed packets by caching the second portion of the first plurality of packets and the second plurality of unprocessed packets.

19. The packet filtering device of claim 11, wherein the instructions, when executed by the one or more processors, cause the packet filtering device to:
  receive, prior to processing packets in accordance with the second set of packet filtering rules, from each processor, of one or more processors associated with the packet filtering device, the one or more signals indicating that reconfiguration of the packet filtering device to process packets in accordance with the second set of packet filtering rules has completed.

20. The packet filtering device of claim 11, wherein the instructions, when executed by the one or more processors, cause the packet filtering device to:
  cease processing, after receiving one or more signals indicating that reconfiguration of the packet filtering device to process packets in accordance with the second set of packet filtering rules has completed, packets in accordance with the first set of packet filtering rules.

21. One or more non-transitory computer-readable media comprising instructions that, when executed, cause a packet filtering device to:
  configure the packet filtering device to process packets in accordance with a first set of packet filtering rules;
  receive a first plurality of packets after configuring the packet filtering device to process packets in accordance with the first set of packet filtering rules;
  begin processing a first portion of the first plurality of packets in accordance with the first set of packet filtering rules;
  receive a second set of packet filtering rules;
  preprocess, during processing of the first plurality of packets in accordance with the first set of packet filtering rules, the second set of packet filtering rules by performing operations on the second set of packet filtering rules, prior to the second set of packet filtering rules being implemented on the packet filtering device, to optimize performance of the packet filtering device, wherein the packet filtering device does not process packets using the second set of packet filtering rules while preprocessing the second set of packet filtering rules;
  in response to a signal to process packets in accordance with the second set of packet filtering rules:
    cease processing of the first plurality of packets, wherein a first portion of the first plurality of packets has completed processing in accordance with the first set of packet filtering rules and a second portion of the first plurality of packets has not completed processing in accordance with the first set of packet filtering rules;
    temporarily store the second portion of the first plurality of packets;
    reconfigure the packet filtering device to process packets in accordance with the second set of packet filtering rules; and
    responsive to receiving one or more signals indicating that reconfiguration of the packet filtering device to process packets in accordance with the second set of packet filtering rules has completed, process a second portion of the first plurality of packets and a second plurality of unprocessed packets in accordance with the second set of packet filtering rules.

22. The one or more non-transitory computer-readable media of claim 21, wherein the instructions, when executed, cause the packet filtering device to:
  detect one or more network conditions indicating an attack, wherein the signal to process packets in accordance with the second set of packet filtering rules is based on detecting one or more network conditions indicating an attack.

23. The one or more non-transitory computer-readable media of claim 21, wherein the instructions, when executed, cause the packet filtering device to preprocess the second set of packet filtering rules by at least one of:
  merging a first rule and a second rule into a single rule;
  separating a third rule into a plurality of rules; or
  reordering one or more rules in the second set of packet filtering rules.

24. The one or more non-transitory computer-readable media of claim 21, wherein the instructions, when executed, cause the packet filtering device to:
  store the first set of packet filtering rules and the second set of packet filtering rules in a memory buffer; and
  adjust a size of the memory buffer based on at least one of a size of the first set of packet filtering rules and a size of the second set of packet filtering rules.

25. The one or more non-transitory computer-readable media of claim 21, wherein the second set of packet filtering rules is received after processing the first portion of the first plurality of packets in accordance with the first set of packet filtering rules.

26. The one or more non-transitory computer-readable media of claim 21, wherein the second set of packet filtering rules are received before processing of the first portion of the first plurality of packets in accordance with the first set of packet filtering rules.

27. The one or more non-transitory computer-readable media of claim 21, wherein the second plurality of unprocessed packets are received after configuring the packet filtering device to process packets in accordance with the second set of packet filtering rules.

28. The one or more non-transitory computer-readable media of claim 21, wherein the instructions, when executed, cause the packet filtering device to temporarily store the second portion of the first plurality of packets and the second plurality of unprocessed packets by caching the second portion of the first plurality of packets and the second plurality of unprocessed packets.

29. The one or more non-transitory computer-readable media of claim 21, wherein the instructions, when executed, cause the packet filtering device to:
receive, prior to processing packets in accordance with the second set of packet filtering rules, from each processor, of one or more processors associated with the packet filtering device, the one or more signals indicating that reconfiguration of the packet filtering device to process packets in accordance with the second set of packet filtering rules has completed.

30. The one or more non-transitory computer-readable media of claim 21, wherein the instructions, when executed, cause the packet filtering device to:
cease processing, after receiving one or more signals indicating that reconfiguration of the packet filtering device to process packets in accordance with the second set of packet filtering rules has completed, packets in accordance with the first set of packet filtering rules.

* * * * *